United States Patent
Tsuduki

(10) Patent No.: US 7,449,654 B2
(45) Date of Patent: Nov. 11, 2008

(54) LATERAL PUSHING TYPE PUSH SWITCH

(75) Inventor: Shiro Tsuduki, Osaka (JP)

(73) Assignee: Hosiden Corporation, Yao-shi, Osaka (JP)

( * ) Notice: Subject to any disclaimer, the term of this patent is extended or adjusted under 35 U.S.C. 154(b) by 0 days.

(21) Appl. No.: 11/878,650

(22) Filed: Jul. 26, 2007

(65) Prior Publication Data

US 2008/0029377 A1    Feb. 7, 2008

(30) Foreign Application Priority Data

| Aug. 1, 2006 | (JP) | ............................ 2006-209466 |
| Aug. 25, 2006 | (JP) | ............................ 2006-228537 |
| Sep. 1, 2006 | (JP) | ............................ 2006-237118 |
| Oct. 27, 2006 | (JP) | ............................ 2006-292068 |

(51) Int. Cl.
   *H01H 5/30*   (2006.01)

(52) U.S. Cl. ................................ 200/406

(58) Field of Classification Search ............... 200/406, 200/520, 529, 533, 516
   See application file for complete search history.

(56) References Cited

U.S. PATENT DOCUMENTS

| 5,660,272 | A | * | 8/1997 | Janniere et al. | ............. | 200/517 |
| 6,018,132 | A | * | 1/2000 | Chen | ........................ | 200/406 |
| 6,180,903 | B1 | * | 1/2001 | Chen | ........................ | 200/406 |
| 6,262,383 | B1 | * | 7/2001 | Nishikawa | ................. | 200/406 |
| 6,495,783 | B2 | * | 12/2002 | Rochon et al. | ............. | 200/406 |
| 6,756,554 | B1 | * | 6/2004 | Hu | ............................ | 200/406 |
| 6,815,628 | B2 | * | 11/2004 | Okita et al. | ................. | 200/406 |
| 7,022,928 | B2 | * | 4/2006 | Watanabe et al. | ........... | 200/406 |
| 7,157,650 | B2 | * | 1/2007 | Rochon | ..................... | 200/1 B |
| 2006/0037851 | A1 | | 2/2006 | Hu | | |

FOREIGN PATENT DOCUMENTS

| EP | 0 743 663 A1 | 11/1996 |
| EP | 1 113 472 A1 | 7/2001 |
| FR | 2 859 567 A1 | 3/2005 |
| JP | 5-1125 | 1/1993 |
| JP | 09 120738 A | 5/1997 |
| JP | 2005 122989 | 5/2005 |

* cited by examiner

*Primary Examiner*—Michael A Friedhofer
(74) *Attorney, Agent, or Firm*—Bacon & Thomas, PLLC

(57) ABSTRACT

A small and thin lateral pushing type push switch of the one- or two-step operation type in which excellent operation properties of a dome-like metal plate serving as a movable contact can be obtained is provided. The push switch has a presser having: an inclined portion 9a which converts an operating force in the moving direction of a push button, to a force in the operation direction of a dome-like metal plate; a flexible hinge portion which allows the inclined portion to be moved in the operation direction of the dome-like metal plate; and a pressing portion which presses down the dome-like metal plate. The dome-like metal plate is disposed in two stages in the operation direction of the metal plate.

21 Claims, 28 Drawing Sheets

LATERAL PUSHING TYPE PUSH SWITCH

BACKGROUND OF THE INVENTION

1. Field of the Invention

The present invention relates to a small and thin lateral pushing type push switch which is used, for example, as an operation switch to be mounted on a side face of a portable telephone, a portable audio player, or the like.

2. Description of the Prior Art

In order to realize a miniaturized and thin structure, frequently, a lateral pushing type push switch of this kind is surface-mounted on a circuit board, and a dome-like metal plate having elasticity is used as a movable contact.

A lateral operating force is converted to a force in a direction perpendicular to the operating direction, and then transmitted to the dome-like metal plate to press down the plate, thereby causing the switch to operate.

Conventionally, such a lateral pushing type push switch is known in, for example, Japanese Patent Application Laying-Open No. 2005-122989. In the switch, one dome-like metal plate is disposed on an inner bottom face of a housing. A push button is supported on the housing, and, in accordance with a pressing operation applied on an operating portion protruded from a side face of the housing, moves while being guided in a direction perpendicular to the operation direction of the dome-like metal plate. The switch comprises: a flexible hinge portion which is formed integrally with the push button and in alignment with the operating portion; and an inclined portion which is formed integrally with a cover attached to the housing, and which converts an operating force in the moving direction of the push button, to a force in an operation direction of the dome-like metal plate. When the tip end of the hinge portion slides over the inclined portion, the operating force in the moving direction of the push button due to a pressing operation on an operating portion is converted to a force in the operation direction of the dome-like metal plate perpendicular to the moving direction of the push button.

SUMMARY OF THE INVENTION

In the conventional lateral pushing type push switch, the component (inclined portion) which converts a lateral operating force to a force in the operation direction of the dome-like metal plate perpendicular to the operating direction of the component, and that (hinge portion) which allows the component to be moved in the operation direction of the dome-like metal plate are separately disposed. Therefore, the operating force cannot be transmitted as it is to the dome-like metal plate, and a substantially center portion of the dome-like metal plate cannot be accurately pressed. Consequently, it is difficult to obtain excellent operation properties of the dome-like metal plate.

In a portable telephone, a portable audio player, or the like, the increase of functions is advancing in addition to miniaturization and thinning. Under this situation, a conventional lateral pushing type push switch is of the one-step operation type which uses a single dome-like metal plate, and in which one kind of switch circuit is on/off operated in one step. Therefore, it is strongly requested to develop a lateral pushing type push switch of the two-step operation type which comprises two dome-like metal plates disposed in two stages in the operation direction, and in which two kinds of switch circuits are on/off operated in two steps. In the case of the two-step operation type, however, the operation stroke of a hinge portion (the press stroke of the dome-like metal plates) is longer than that in the one-step operation type, and hence it is more difficult to obtain excellent operation properties of the dome-like metal plates. Moreover, in order to lengthen the operation stroke of the hinge portion, the size of an inclined portion must be increased. This causes a fatal problem that the thickness of a final product is increased.

The invention has been conducted in view of the above-discussed problems. It is a first object of the invention to provide a small and thin lateral pushing type push switch in which excellent operation properties of a dome-like metal plate can be obtained.

It is a second object of the invention to provide a small and thin lateral pushing type push switch of the two-step operation type in which excellent operation properties of a dome-like metal plate can be obtained.

In order to attain the first object, the lateral pushing type push switch of the invention is a switch in which an operating portion of a push button is protruded from a side portion, an elastic dome-like metal plate is used as a movable contact, and an operating force in a moving direction of the push button due to a pressing operation on the operating portion is converted to a force in an operation direction of the dome-like metal plate perpendicular to the moving direction of the push button, wherein the switch comprises a presser having: an inclined portion which converts the operating force in the moving direction of the push button, to a force in the operation direction of the dome-like metal plate; a flexible hinge portion which allows the inclined portion to be moved in the operation direction of the dome-like metal plate; and a pressing portion which presses down the dome-like metal plate. The operating force is transmitted as it is to the dome-like metal plate, a substantially center portion of the dome-like metal plate is accurately pressed, and excellent operation properties of the dome-like metal plate are obtained.

In order to attain the second object, in the lateral pushing type push switch of the invention, the dome-like metal plate is disposed in two stages in the operation direction, thereby obtaining a lateral pushing type push switch of the two-step operation type.

In the lateral pushing type push switch of the invention, the presser is integrally formed with being coupled by the hinge portion to a guide member which guides and supports the push button in the moving direction of the push button. According to the configuration, positional accuracies of the push button and the inclined portion are improved, and therefore it is possible to obtain excellent operation properties of the dome-like metal plate.

In the lateral pushing type push switch of the invention, the presser is formed into a T-like shape which has two fixed ends and one free end, and which is flexible, the inclined portion is formed in the free end of the presser, and the dome-like metal plate is pressed down by the free end of the presser while a portion of the presser between the two fixed ends is twistingly deformed by pressing of the push button. According to the configuration, the deformation amount of the whole presser can be reduced, and a stress produced in the presser can be reduced. Therefore, the durability of the presser can be improved without enlarging the external shape of the presser. Consequently, it is possible to attain a small and thin lateral pushing type push switch or lateral pushing type push switch of the two-step operation type which has a long life, and in which excellent operation properties of a dome-like metal plate can be obtained.

In the lateral pushing type push switch of the invention, the presser is integrally formed by coupling the two fixed ends of the presser to a guide member which laterally reciprocably supports the push button. According to the configuration, excessive pressing (overstroke) on the push button is accurately limited, whereby reductions of the durabilities of the presser and the dome-like metal plate due to excessive pressing on the push button can be prevented from occurring, and excellent operation properties of the dome-like metal plate can be obtained until the life of the switch ends.

In the lateral pushing type push switch of the invention, the push button and the presser are in line contact with each other while rounding one of contact surfaces of the push button and the presser. According to the configuration, sliding friction between the push button and the free end (inclined portion) of the presser is reduced, so that wear of sliding portions of the push button and the free end of the presser is suppressed, and a stable press stroke of the dome-like metal plate is obtained. Therefore, excellent operation properties of the dome-like metal plate can be obtained until the life of the switch ends.

In the lateral pushing type push switch of the invention, a movable stopper is formed integrally with the push button, and a stationary stopper is formed integrally with the guide member, the stationary stopper receiving the movable stopper to restrict a movement of the push button due to a pressing operation on the operating portion, to a predetermined position. According to the configuration, an excess movement of the push button which causes excessive pressing of the dome-like metal plate is accurately limited, and therefore excellent operation properties of the dome-like metal plate can be obtained. Moreover, reductions of the durabilities of the presser and the dome-like metal plate due to excessive pressing on the push button can be prevented from occurring, and excellent operation properties of the dome-like metal plate can be obtained until the life of the switch ends.

In the lateral pushing type push switch of the invention, the presser itself has an inclination gentler than an inclination of the inclined portion. According to the configuration, in the case of the one-step operation type, an operation stroke required in the presser can be obtained while reducing the size of the inclined portion, and, in the case of the two-step operation type, the operation stroke of the presser can be lengthened without increasing the size of the inclined portion.

In the lateral pushing type push switch of the invention, when the movement of the push button is restricted by the movable stopper and the stationary stopper, the presser is substantially parallel to an installation surface of the dome-like metal plate. According to the configuration, the presser maintains the operation state of the dome-like metal plate, in a posture that it is substantially parallel to the installation surface, and hence high contact reliability can be obtained.

In the lateral pushing type push switch of the invention, the pressing portion of the presser is made of a resin, and the hinge portion is formed by a metal plate spring. According to the configuration, since the hinge portion is made by a metal, improvement of durability and stabilization of properties can be realized.

In the lateral pushing type push switch of the invention, the push button comprises a presser press-down portion which is integrated with the operating portion, the inclined portion causes the presser press-down portion to slide after contact, thereby converting the operating force in the moving direction of the push button, to a force in the operation direction of the dome-like metal plate, and the presser has a curved portion which is formed continuously with the inclined portion, and which deforms to absorb an excess operating force due to an excess press stroke of the push button. According to the configuration, an excess operating force due to an excess press stroke of the push button is absorbed by deformation of the curved portion of the presser. Therefore, the initial shapes of the inclined portion of the presser and the hinge portion are prevented from being deformed, and hence high contact reliability can be obtained.

DETAILED DESCRIPTION OF THE PREFERRED EMBODIMENT

Figure 1:
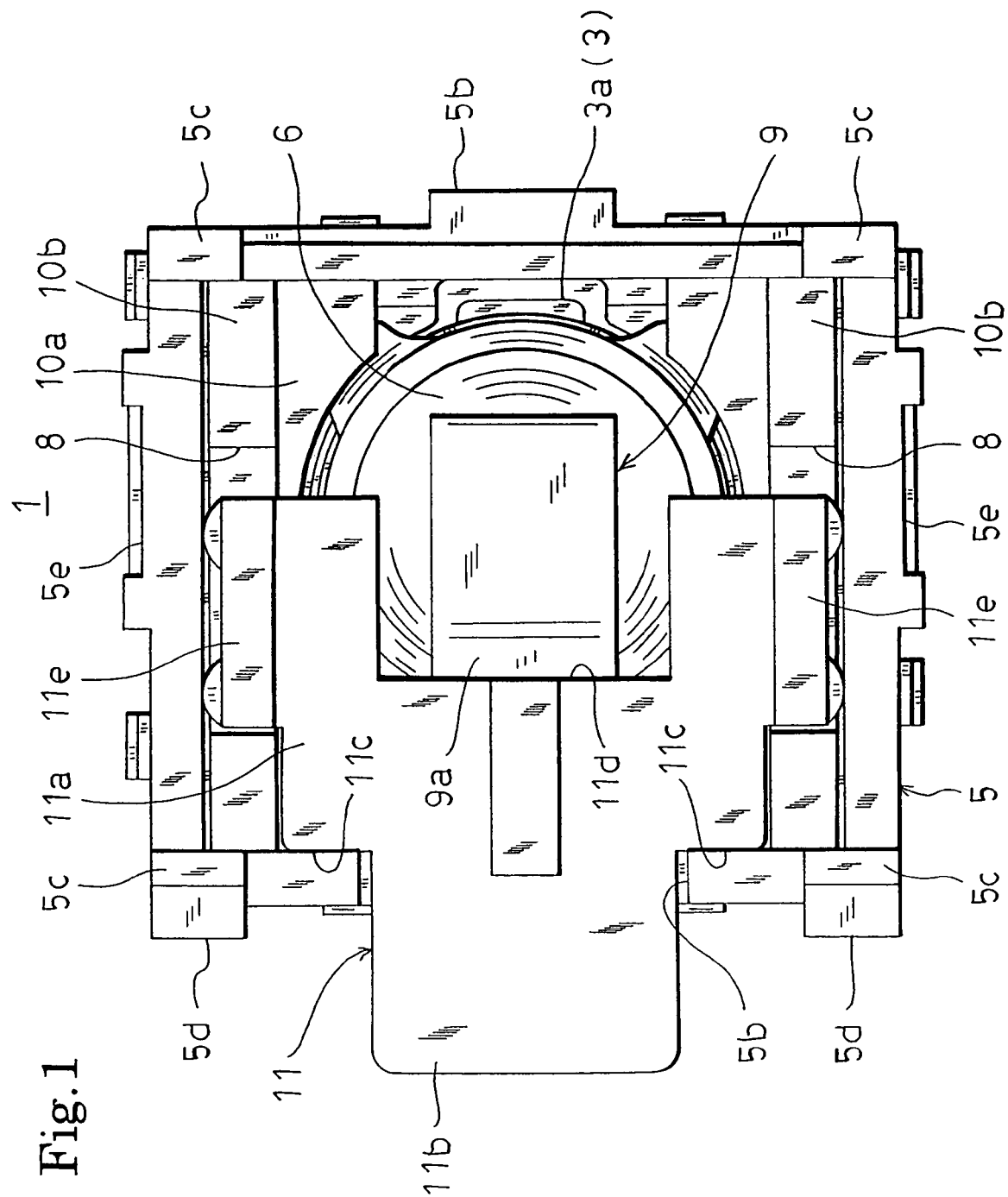
FIG. 1 is a plan view of a lateral pushing type push switch of a first embodiment of the invention.

Hereinafter, a first embodiment of the lateral pushing type push switch of the invention will be described with reference to FIGS. 1 to 7. FIG. 1 is a plan view of a lateral pushing type push switch of the first embodiment, FIG. 2 is a section view of the lateral pushing type push switch, and FIG. 3 is an assembly view of the lateral pushing type push switch.

Figure 2:
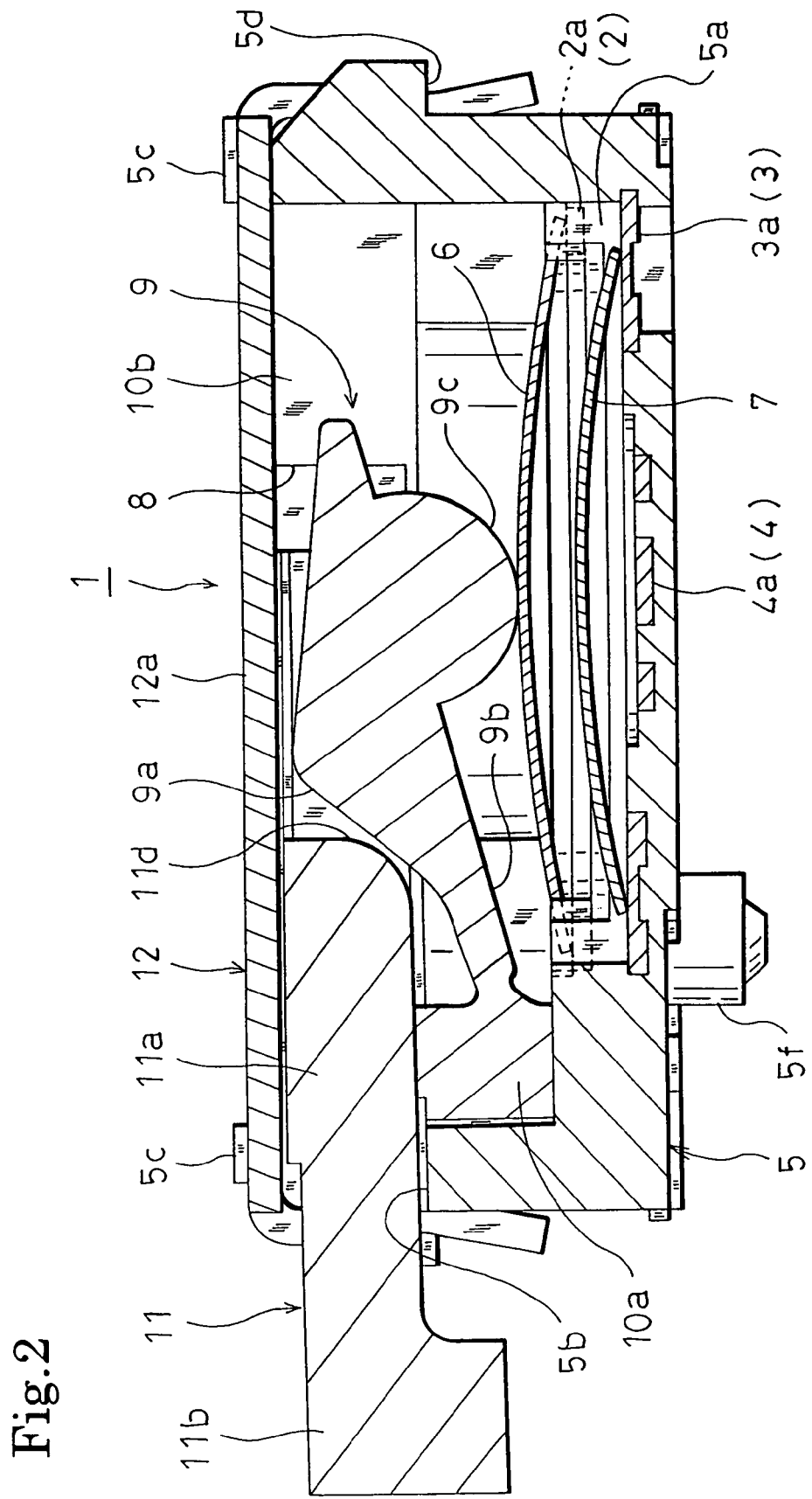
FIG. 2 is a section view showing a state before the lateral pushing type push switch of FIG. 1 is operated.
Figure 3:
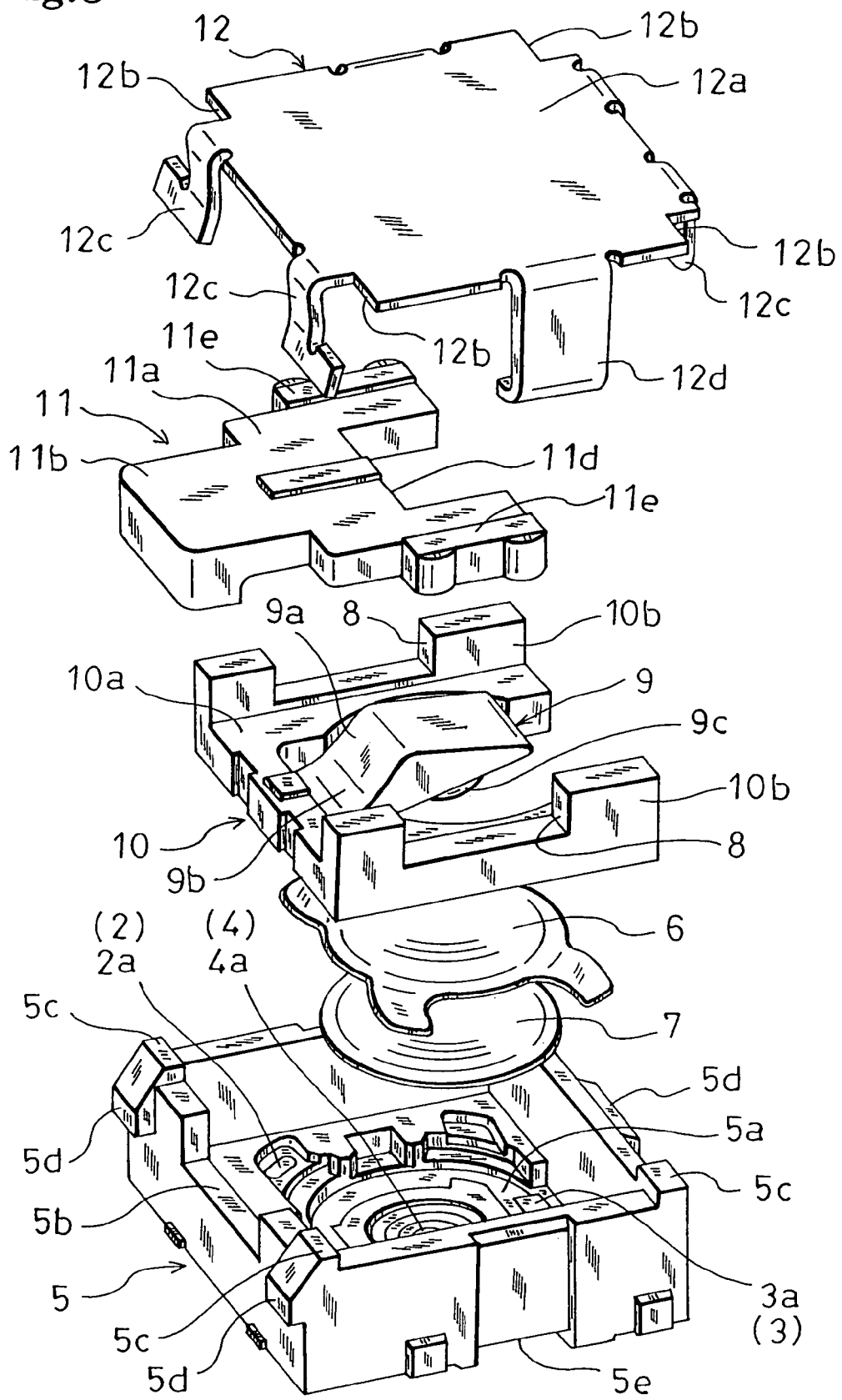
FIG. 3 is an assembly view of the lateral pushing type push switch of FIG. 1.

As shown in FIGS. 1 to 3, the lateral pushing type push switch 1 of the first embodiment is a switch of the two-step operation type in which two kinds of switch circuits are on/off operated in two steps. The switch is configured by: an insulative housing 5 which is made of a synthetic resin, and which is formed integrally with three or first, second, and third stationary contact terminals 2, 3, 4 by insert molding or the like; two or first and second elastic dome-like metal plates 6, 7 which are used as two or first and second movable contacts; an insulative guide member 10 which is made of a synthetic resin, and in which a stationary stopper 8 and a presser 9 are integrally formed; an insulative push button 11 which is made of a synthetic resin, and which is pressingly operated in a lateral direction; and a cover 12 which cooperates with the housing 5 to form a switch case.

The housing 5 is formed into a box-like shape in which the upper face is opened. A stepped recess 5a is formed on the inner bottom face of the housing. In an outer peripheral step face of the stepped recess 5a, a part of the first stationary contact terminal 2 is exposed substantially flush therewith to form a common contact 2a serving as a first stationary contact. In a bottom face outer side of the stepped recess 5a, a part of the second stationary contact terminal 3 is exposed substantially flush therewith to form a first selection contact 3a serving as a second stationary contact. In a bottom face center portion of the stepped recess 5a, a part of the third stationary contact terminal 4 is exposed substantially flush therewith to form a second selection contact 4a serving as a third stationary contact.

The stationary contact terminals 2, 3, 4 are formed by punching and bending an electrically conductive thin metal plate. One end of each of the stationary contact terminals 2, 3, 4 is led out to the outside of the housing 5 to form an external connection terminal (not shown) for surface-mounting the lateral pushing type push switch 1. The external connection terminals are to be fixed and connected by soldering to a printed circuit board which is not shown.

A recessed cutaway 5b for allowing the push button to be protruded is formed in a middle upper portion of one (left side wall) of the four side walls of the housing 5. Projections 5c which are upward protruded to be used for positioning the cover are formed in the four corners of the upper face side of the housing 5, respectively. Engaging claws 5d and engaging grooves 5e for fixing the cover are formed in the four side walls of the housing 5. The engaging claws 5d are outward protruded from upper portions of the both ends of the side wall in which the cutaway 5b is formed, and an upper middle portion of the outer face of the side wall that is opposed to that side wall. The engaging grooves 5e are formed in middle portions of the outer faces of the remaining two side walls that are opposed to each other. Lower end portions of the engaging grooves 5e are inward bent along the outer bottom face of the housing 5. A projection 5f for positioning with respect to the printed circuit board which is not shown is formed on the outer bottom face of the housing 5.

The first and second dome-like metal plates 6, 7 are formed by an electrically conductive thin metal plate (spring metal material). The first dome-like metal plate 6 is supported by the outer, peripheral step face of the stepped recess 5a, and the second dome-like metal plate 7 is supported by the bottom face of the stepped recess 5a, so that the first and second dome-like metal plates 6, 7 are disposed in two or upper and lower stages on the stepped recess 5a of the housing 5. An outer side portion of the first dome-like metal plate 6 is always in contact with the common contact 2a. An outer side portion of the second dome-like metal plate 7 is always in contact with the first selection contact 3a, and a center portion is opposed to the second selection contact 4a.

Figure 4A:
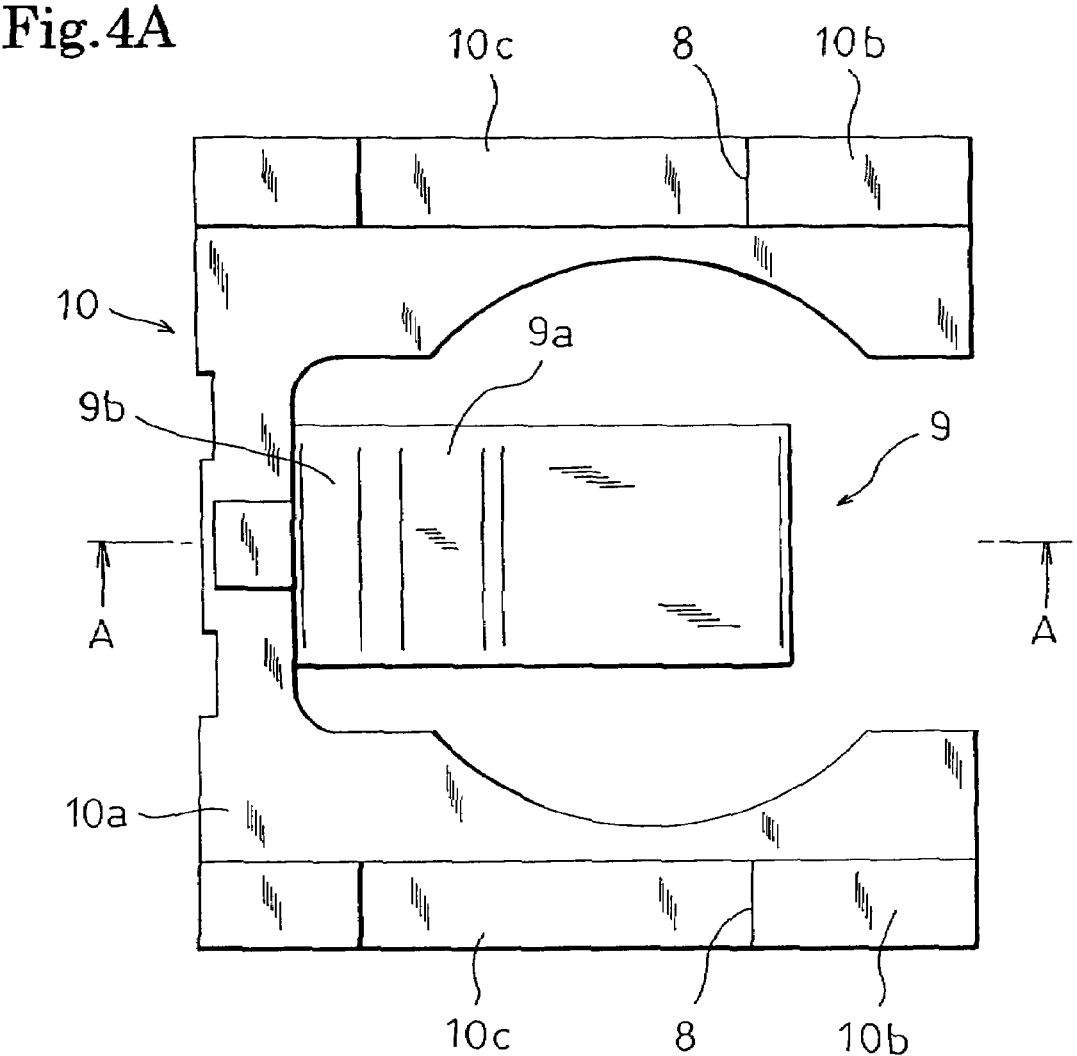
FIG. 4(A) is a plan view of a guide member of the lateral pushing type push switch of FIG. 1.
Figure 4B:
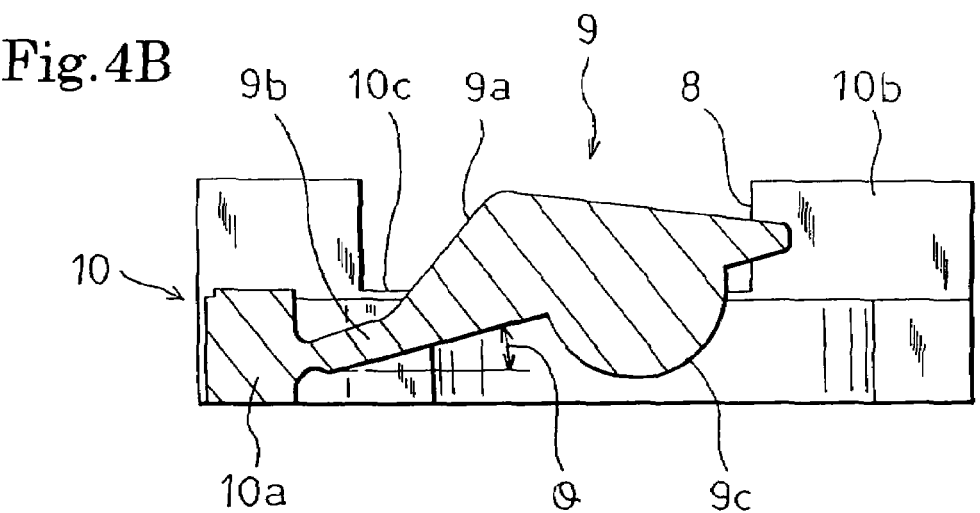
FIG. 4(B) is a section view taken along the line A-A of FIG. 4(A).
Figure 5A:
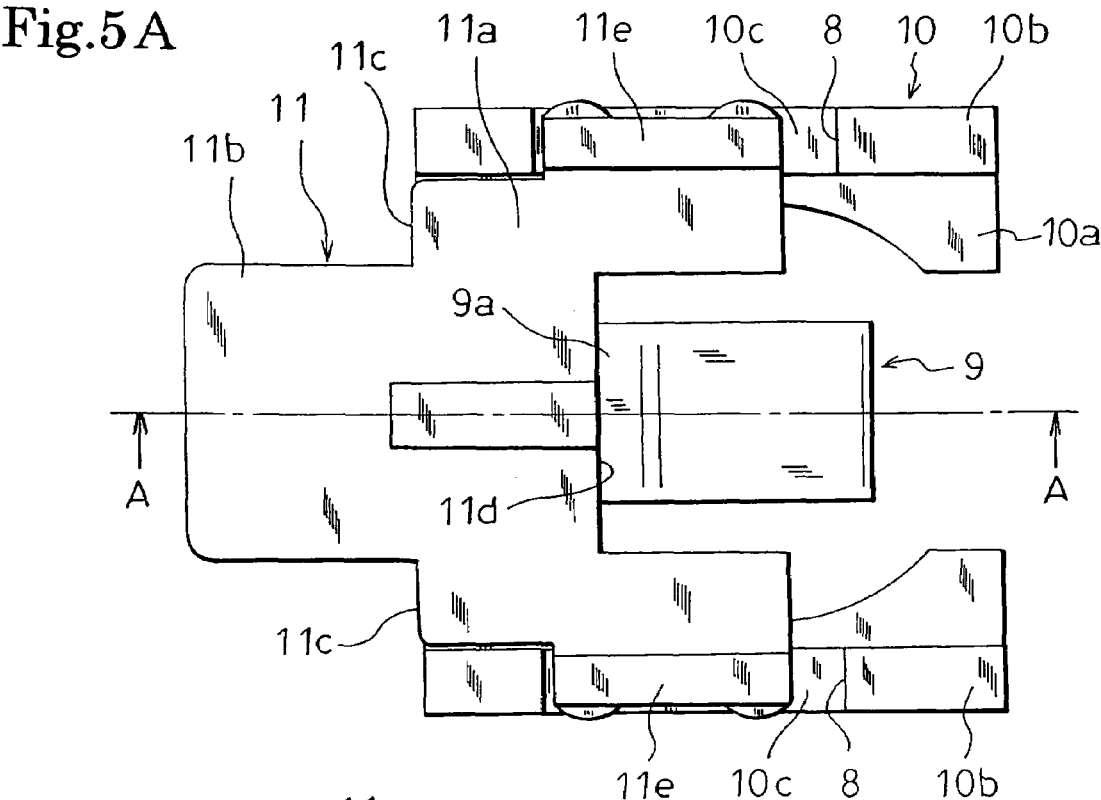
FIG. 5(A) is a plan view of a state where a push button is set on the guide member of the lateral pushing type push switch of FIG. 1.
Figure 5B:
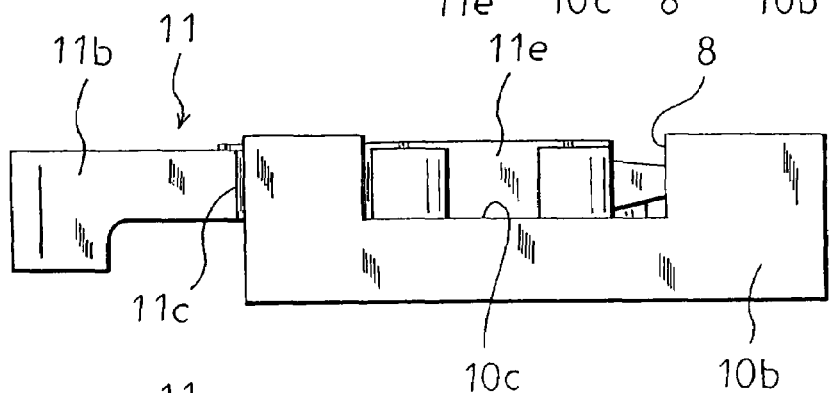
FIG. 5(B) is a bottom view of FIG. 5(A)
Figure 5C:
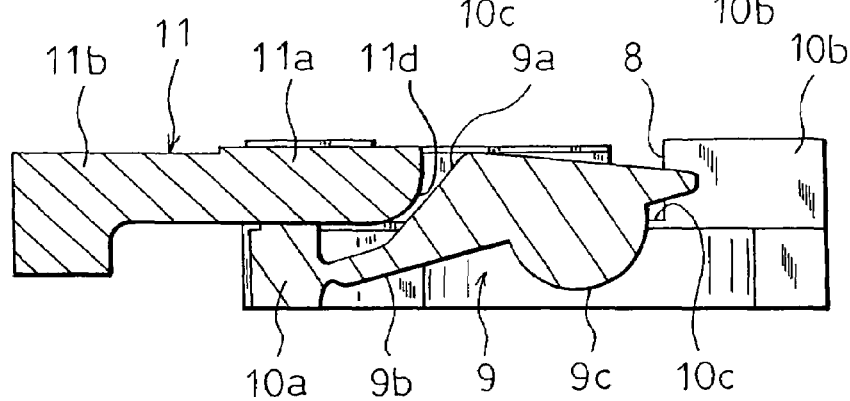
FIG. 5(C) is a section view taken along the line A-A of FIG. 5(A).

FIG. 4(A) is a plan view of a guide member, FIG. 4(B) is a section view taken along the line A-A of FIG. 4(A), FIG. 5(A) is a plan view of a state where the push button is set on the guide member, FIG. 5(B) is a bottom view of FIG. 5(A), and FIG. 5(C) is a section view taken along the line A-A of FIG. 5(A).

As shown in FIGS. 1 to 5, in the guide member 10, a base plate portion 10a which is formed into a U-like shape in a plan view, and guide wall portions 10b which are raised from outer edges of both edge portions of the base plate portion 10a are integrally formed. In a state where the outer side face of an intermediate edge of the base plate portion 10a is in contact with the lower inner face of the side wall in which the cutaway 5b of the housing 5 is formed, the outer side faces of the both edge portions of the base plate portion 10a, and the outer side faces of the guide wall portions 10b are in contact with the inner faces of the two side walls adjacent to the side wall in which the cutaway 5b of the housing 5 is formed, and the end faces of the both edge portions of the base plate portion 10a are in contact with the inner face of the side wall opposed to the side wall in which the cutaway 5b of the housing 5 is formed, the guide member 10 is placed on the inner bottom face which is in the periphery of the stepped recess 5a of the housing 5, so as not to cover the first dome-like metal plate 6, and fixed by pressing the upper side faces of the guide wall portions 10b with the cover 12.

A recessed cutaway 10c for restricting the movement of the push button 11 is formed in a middle upper portion of each of the guide wall portions 10b. The side end face of one side (right side) of each of the cutaways 10c is formed as the stationary stopper 8 for restricting the movement of the push button 11.

In the presser 9, an inclined portion 9a which converts the operating force in the moving direction of the push button 11, to a force in the operation direction of the first and second dome-like metal plates 6, 7, a flexible hinge portion 9b which allows the inclined portion 9a to be moved in the operation direction of the first and second dome-like metal plates 6, 7, and a pressing portion 9c which presses down the first and second dome-like metal plates 6, 7 are integrally formed. The presser 9 is coupled by the hinge portion 9b to a middle portion of the intermediate edge of the base plate portion 10a, and protruded from the middle portion of the intermediate edge of the base plate portion 10a and into between the guide wall portions 10b, in a cantilevered manner with forming an inclination angle θ or an inclination gentler than that of the inclined portion 9a. The inclined portion 9a is placed inside the cutaway 5b of the housing 5. The pressing portion 9c is placed on the first dome-like metal plate 6.

In the push button 11, a base plate portion 11a which is formed into a U-like shape in a plan view, an operating portion 11b which is protruded from a middle outer side face of an intermediate edge of the base plate portion 11a, and shoulder portions 11c configured by both end outer side faces of the intermediate edge of the base plate portion 11a are integrally formed. In a state where the operating portion 11b is outward protruded from the cutaway 5b of the housing 5, the shoulder portions 11c are opposed to inner faces of the side wall in which the cutaway 5b of the housing 5 is formed, the lower face of the base plate portion 11a is in contact with the upper face of the base plate portion 10a, and the outer side faces of both end edge portions of the base plate portion 11a are in contact with the inner faces of the guide wall portions 10b, the push button 11 is supported by the guide member 10, the upper face of the base plate portion 11a is slidably pressed by the cover 12, and the push button 11 is slidingly guided in the pressing operation direction of the operating portion 11b.

The inclined portion 9a of the presser 9 is protruded from below to the inside of the base plate portion 11a. A middle inner side face of the intermediate edge of the base plate portion 11a opposed to the inclined portion 9a is formed as a presser press-down portion 11d which presses down the presser 9 while sliding in contact with the inclined portion 9a.

Movable stoppers 11e are formed integrally with outer side faces of the both end edges of the base plate portion 11a, respectively. The movable stoppers 11e are outward protruded to be fit into the cutaways 10c formed in the guide wall portions 10b of the guide member 10, and received by the stationary stoppers 8 when the push button 11 is moved as a result of a pressing operation on the operating portion 11b, thereby restricting the movement of the push button 11 to a predetermined position.

The cover 12 is formed by punching and bending an electrically conductive metal plate. The cover 12 comprises: a flat upper side plate 12a which covers the upper face of the housing 5; cover-positioning cutaways 12b which are formed in the four corners of the upper side plate 12a, and which are fitted with the projections 5c of the housing 5, respectively; first engaging portions 12c which are downward extended from two opposing side edges of the upper side plate 12a, and in which lower end portions are engaged from below with the engaging claws 5d of the housing 5, thereby fixing the cover 12; and second engaging portions 12d which are downward extended from the remaining two opposing side edges of the upper side plate 12a, and in which, in a state where they are fitted into the engaging grooves 5e of the housing 5, lower end portions are engaged from below with the outer bottom face of the housing 5, thereby fixing the cover 12.

As shown in FIG. 3, the lateral pushing type push switch 1 of the first embodiment is assembled in the following manner. The first and second dome-like metal plates 6, 7 are disposed in two or upper and lower stages in the stepped recess 5a of the housing 5. Then, the guide member 10 in which the stationary stoppers 8 and the presser 9 are integrally formed is placed on the inner bottom face which is in the periphery of the stepped recess 5a. While the operating portion 11b of the push button 11 is fitted into the cutaway 5b of the housing 5, and the movable stoppers 11e of the push button 11 are fitted into the cutaways 10c of the guide member 10, the base plate portion 11a of the push button 11 is overlapped on the base plate portion 10a of the guide member 10. Finally, the cover 12 is fitted from above to the housing 5 to be positioned and engaged therewith, thereby completing the assembling process.

Figure 6:
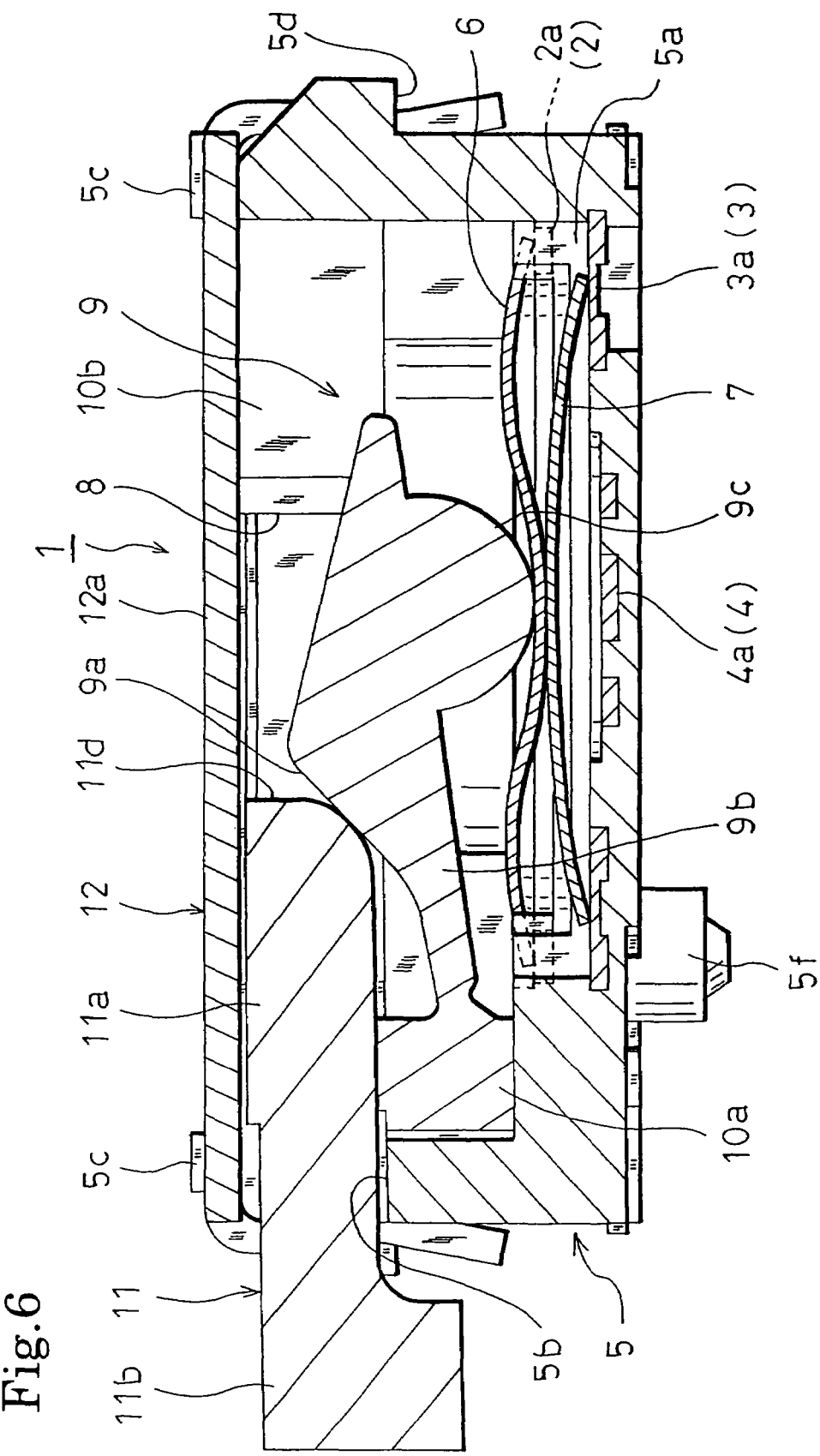
FIG. 6 is a section view showing a state after a first step switch of the lateral pushing type push switch of FIG. 1 is operated.
Figure 7:
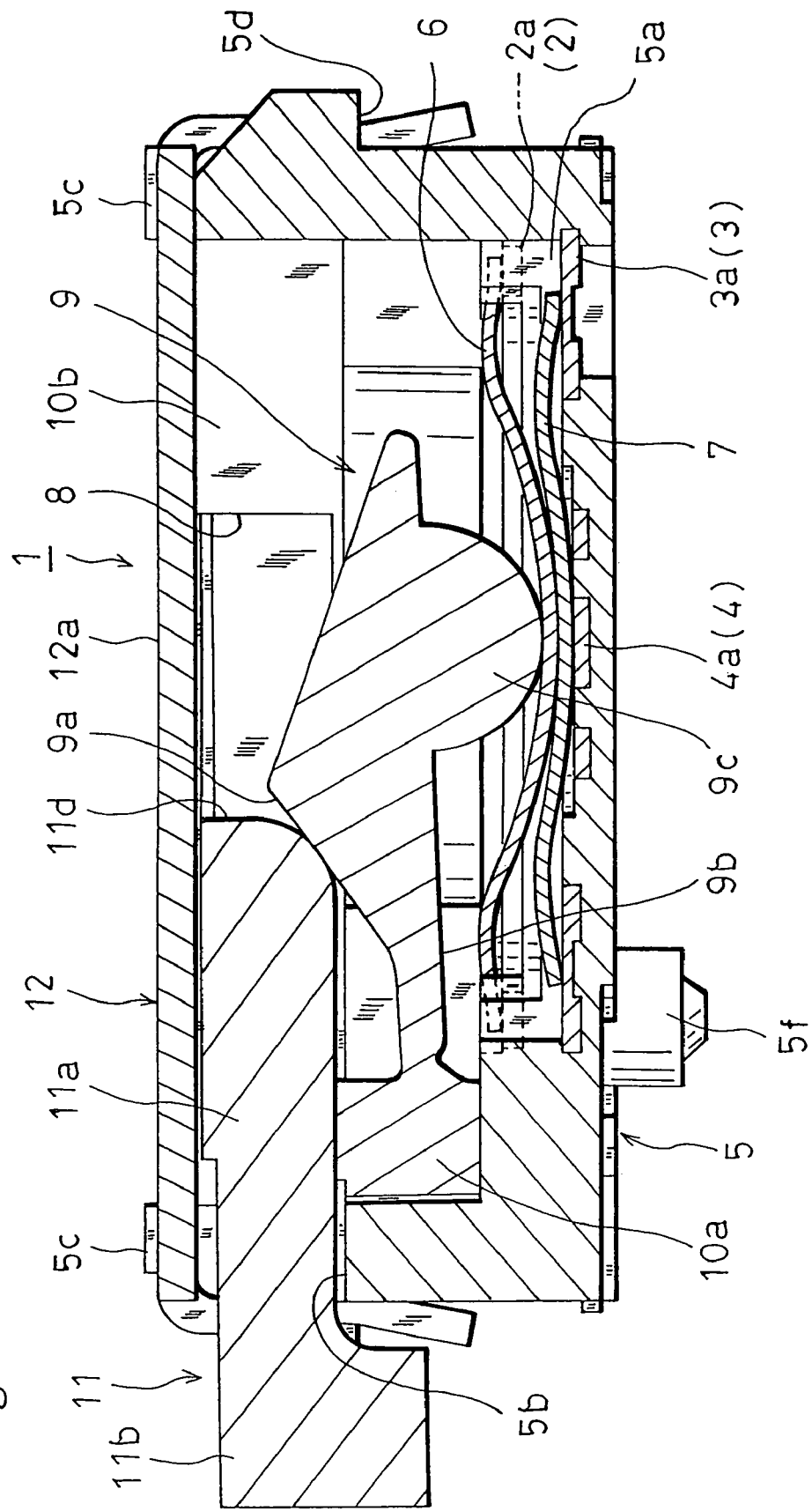
FIG. 7 is a section view showing a state after a second step switch of the lateral pushing type push switch of FIG. 1 is operated.

FIG. 6 is a section view showing a state after the switch operation of a first step (after the operation of the first dome-like metal plate) in the lateral pushing type push switch of the first embodiment, and FIG. 7 is a section view showing a state after the switch operation of a second step (after the operation of the second dome-like metal plate) in the lateral pushing type push switch. The operation of the lateral pushing type push switch of the first embodiment will be described with reference to FIGS. 2, 6, and 7.

FIG. 2 shows a state before the lateral pushing type push 1 is operated. In a pre-operation state in which the push button 11 is not operated, the push button 11 is held to a position where the shoulder portions 11c of the push button 11 butt against the inner faces on the both sides of the cutaway 5b of the side wall in which the cutaway 5b of the housing 5 is formed, and the movable stoppers 11e are positioned in left end portions of the cutaways 10c formed in the guide wall portions 10b of the guide member 10, and the presser press-down portion 11d does not press the inclined portion 9a of the presser 9. Therefore, the hinge portion 9b receives little elastic deformation, and the presser 9 is held to an inclined posture in a substantially free state.

The first and second dome-like metal plates 6, 7 are separated from each other in an upward inflated state, and the second dome-like metal plate 7 is separated from the second selection contact 4a. In this case, the pressing portion 9c of the presser 9 is upward pushed by a substantially center portion of the upper face of the first dome-like metal plate 6. Therefore, the presser 9 is held to an inclined posture in which the inclination angle is slightly steeper than the inclination angle θ in the free state, and the lower end of the pressing portion 9c is kept to be in contact with the substantially center portion of the upper face of the first dome-like metal plate 6.

When, in this state, the operating portion 11b of the push button 11 is pressed in the right direction of FIG. 2, the presser press-down portion 11d is rightward moved to press the inclined portion 9a of the presser 9 in the right direction, and slide over the surface of the inclined portion 9a as shown in FIG. 6. In accordance with this, the presser 9 is downward pressed while the hinge portion 9b is flexed and elastically deformed. Therefore, the pressing portion 9c presses down the substantially center portion of the upper face of the first dome-like metal plate 6.

This causes the first dome-like metal plate 6 to be inverted to the downward direction, and in contact with the second dome-like metal plate 7 in the lower side. Therefore, the common contact 2a and the first selection contact 3a become conductive with each other through the first and second dome-like metal plates 6, 7, and the first switch of the first step is turned on.

When, in this state, the operating portion 11b of the push button 11 is further pressed in the right direction, the presser press-down portion 11d is rightward moved to further press the inclined portion 9a of the presser 9 in the right direction, and further slide over the surface of the inclined portion 9a as shown in FIG. 7. In accordance with this, the presser 9 is further downward pressed while the hinge portion 9b is further flexed and elastically deformed. Therefore, the pressing portion 9c presses down the substantially center portion of the upper face of the second dome-like metal plate 7 through the first dome-like metal plate 6.

This causes the second dome-like metal plate 7 to be inverted to the downward direction, and in contact with the second selection contact 4a. Therefore, the common contact 2a and the second selection contact 4a become conductive with each other through the first and second dome-like metal plates 6, 7, and the second switch of the second step is turned on following the first switch of the first step.

At this time, the movable stoppers 11e of the push button 11 are moved to the right end portions in the cutaways 10c formed in the guide wall portions 10b of the guide member 10, and received by the stationary stoppers 8 of the guide member 10, thereby restricting the movement of the push button 11 due to the pressing operation on the operating portion 11b, and limiting an excess movement (overstroke) of the push button 11 which causes excessive pressing of the first and second dome-like metal plates 6, 7. Therefore, the presser 9 keeps the operation states of the first and second dome-like metal plates 6, 7 to a substantially horizontal posture in which they are approximately parallel to the installation surface. During a period when the operating portion 11b is pressed and the second dome-like metal plate 7 is in contact with the second selection contact 4a, the on states of the first and second switches are maintained.

When, in this state, the press operating force on the operating portion 11b is released, the presser 9 is returned by an elastic returning force of the hinge portion 9b to the state before the switch operation shown in FIG. 6, and also the push button 11 is returned to the state before the switch operation shown in FIG. 6. At this time, in accordance with the return of the presser 9, the first and second dome-like metal plates 6, 7 are inverted to the upward direction by their elastic forces, and the second dome-like metal plate 7 is separated from the second selection contact 4a to turn off the second switch. Subsequently, the first dome-like metal plate 6 is separated from the second dome-like metal plate 7 to turn off the first switch.

As described above, the lateral pushing type push switch 1 of the first embodiment is a lateral pushing type push switch in which the operating portion 11b of the push button 11 is protruded from a side portion, the dome-like metal plates 6, 7 having elasticity are used as movable contacts, and the operating force in the moving direction of the push button 11 due to the pressing operation on the operating portion 11b is converted to a force in the operation direction of the dome-like metal plates 6, 7 perpendicular to the moving direction of the push button 11, wherein the switch comprises the presser 9 having: the inlined portion 9a which converts the operating force in the moving direction of the push button 11, to a force in the operation direction of the dome-like metal plates 6, 7; the flexible hinge portion 9b which allows the inclined portion 9a to be moved in the operation direction of the dome-like metal plates 6, 7; and the pressing portion 9c which presses down the dome-like metal plates 6, 7. Therefore, the operating force is transmitted as it is to the dome-like metal plates 6, 7. Moreover, the substantially center portions of the dome-like metal plates 6, 7 can be accurately pressed. Consequently, excellent operation properties of the dome-like metal plates 6, 7 can be obtained.

Furthermore, the presser 9 is integrally formed with being coupled by the hinge portion 9b to the guide member 10 which guides and supports the push button 11 in the moving direction of the push button. Therefore, positional accuracies of the push button 11 and the inclined portion 9a can be improved, and hence it is possible to obtain excellent operation properties of the dome-like metal plates 6, 7.

The movable stoppers 11e are formed integrally with the push button 11, and the stationary stoppers 8 are formed integrally with the guide member 10, and the stationary stoppers receive the movable stoppers 11e to restrict the movement of the push button 11 due to the pressing operation on the operating portion 11b, to the predetermined position. Therefore, an excess movement (overstroke) of the push button 11 which causes excessive pressing of the dome-like metal plates 6, 7 can be accurately limited, and therefore excellent operation properties of the dome-like metal plates 6, 7 can be obtained.

The presser 9 itself has the inclination gentler than that of the inclined portion 9a. In the case of the one-step operation type, therefore, the operation stroke required in the presser 9 can be obtained while reducing the size of the inclined portion 9a, and, in the case of the two-step operation type, the operation stroke of the presser 9 can be lengthened without increasing the size of the inclined portion 9a.

When the movement of the push button 11 is restricted by the movable stoppers 11e and the stationary stoppers 8, the presser 9 is substantially parallel to the installation surface of the dome-like metal plates 6, 7. Therefore, the presser 9 can maintain the operation states of the dome-like metal plates 6, 7, in the posture that it is substantially parallel to the installation surface, and hence high contact reliability can be obtained.

In the lateral pushing type push switch 1 of the first embodiment, the dome-like metal plates 6, 7 are disposed in two stages in the operation direction. Therefore, a lateral pushing type push switch of the two-step operation type can be obtained without increasing the thickness of a final product.

Therefore, it is possible to provide the small and thin lateral pushing type push switch 1 in which excellent operation properties of the dome-like metal plates 6, 7 can be obtained, and which has high contact reliability. Furthermore, it is possible to provide the lateral pushing type push switch 1 of the two-step operation type in which excellent operation properties of the dome-like metal plates 6, 7 can be obtained, which is small and thin, and which has high contact reliability.

Figure 8:
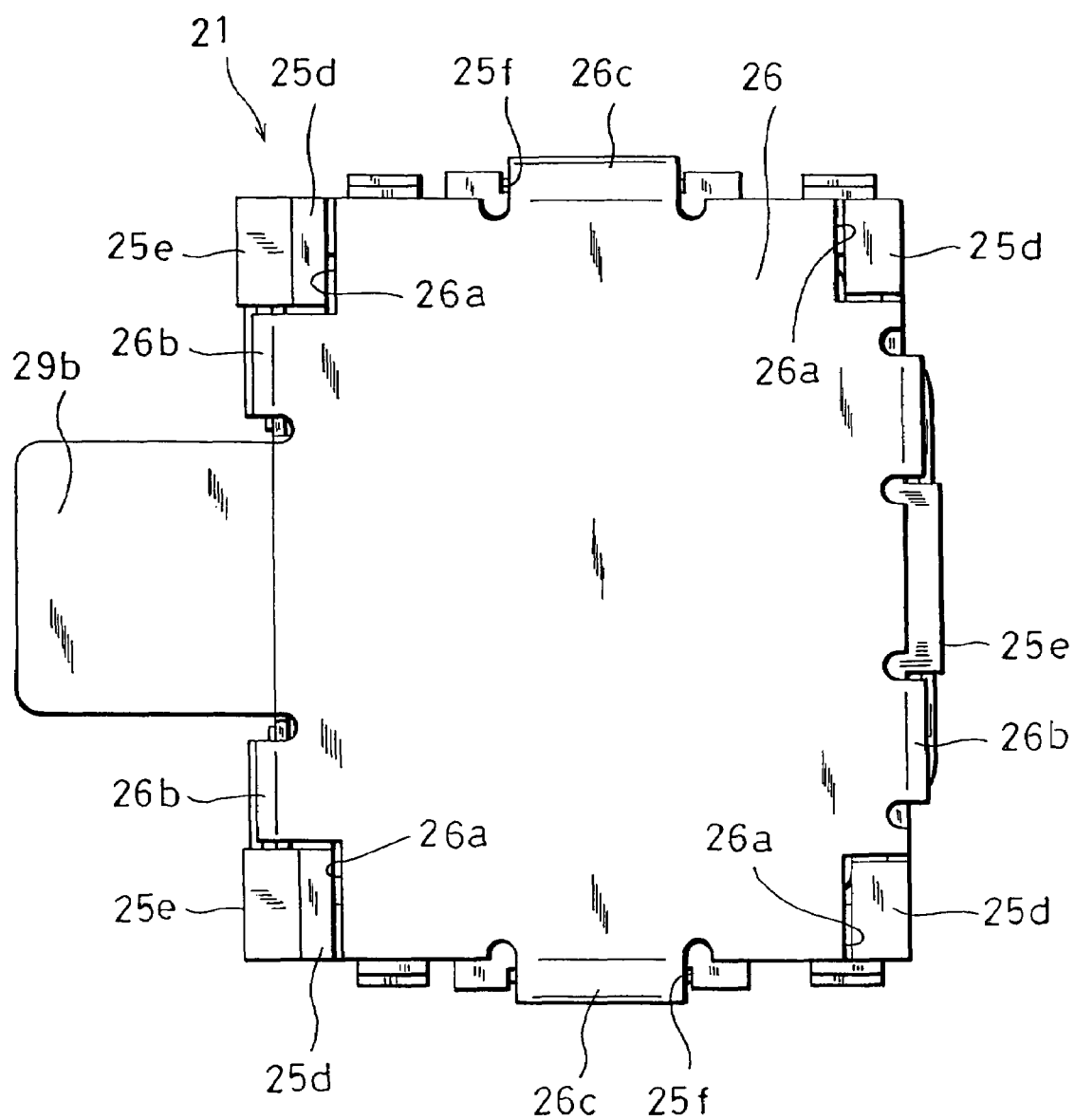
FIG. 8 is a plan view showing the appearance of a lateral pushing type push switch of a second embodiment of the invention.
Figure 9:
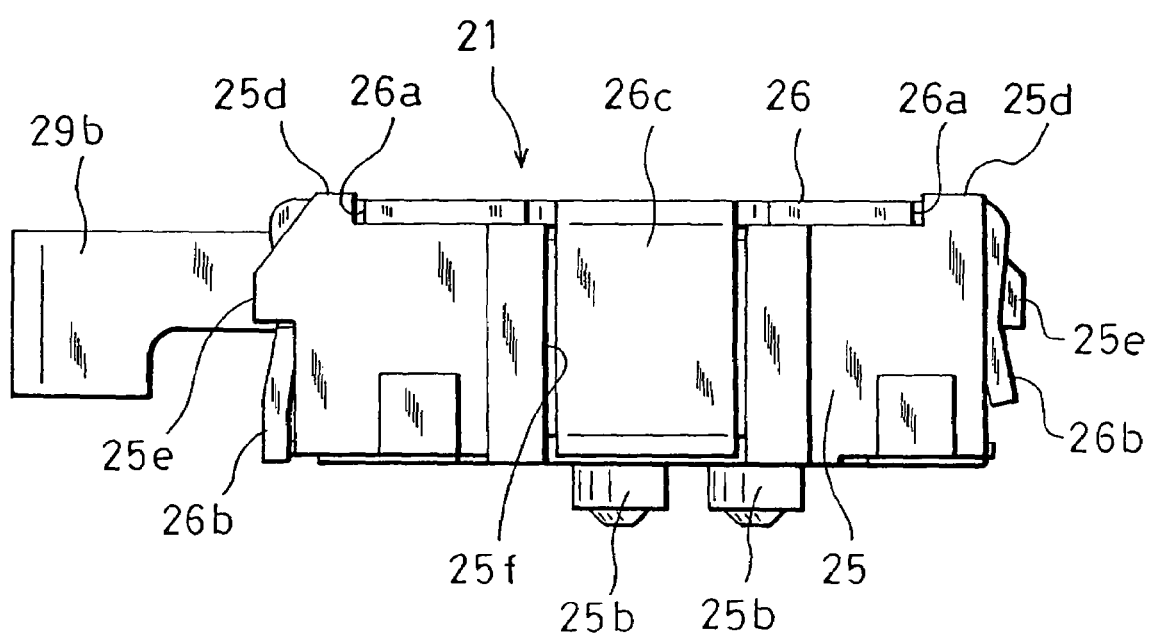
FIG. 9 is a side view showing the appearance of the lateral pushing type push switch of FIG. 8.
Figure 10:
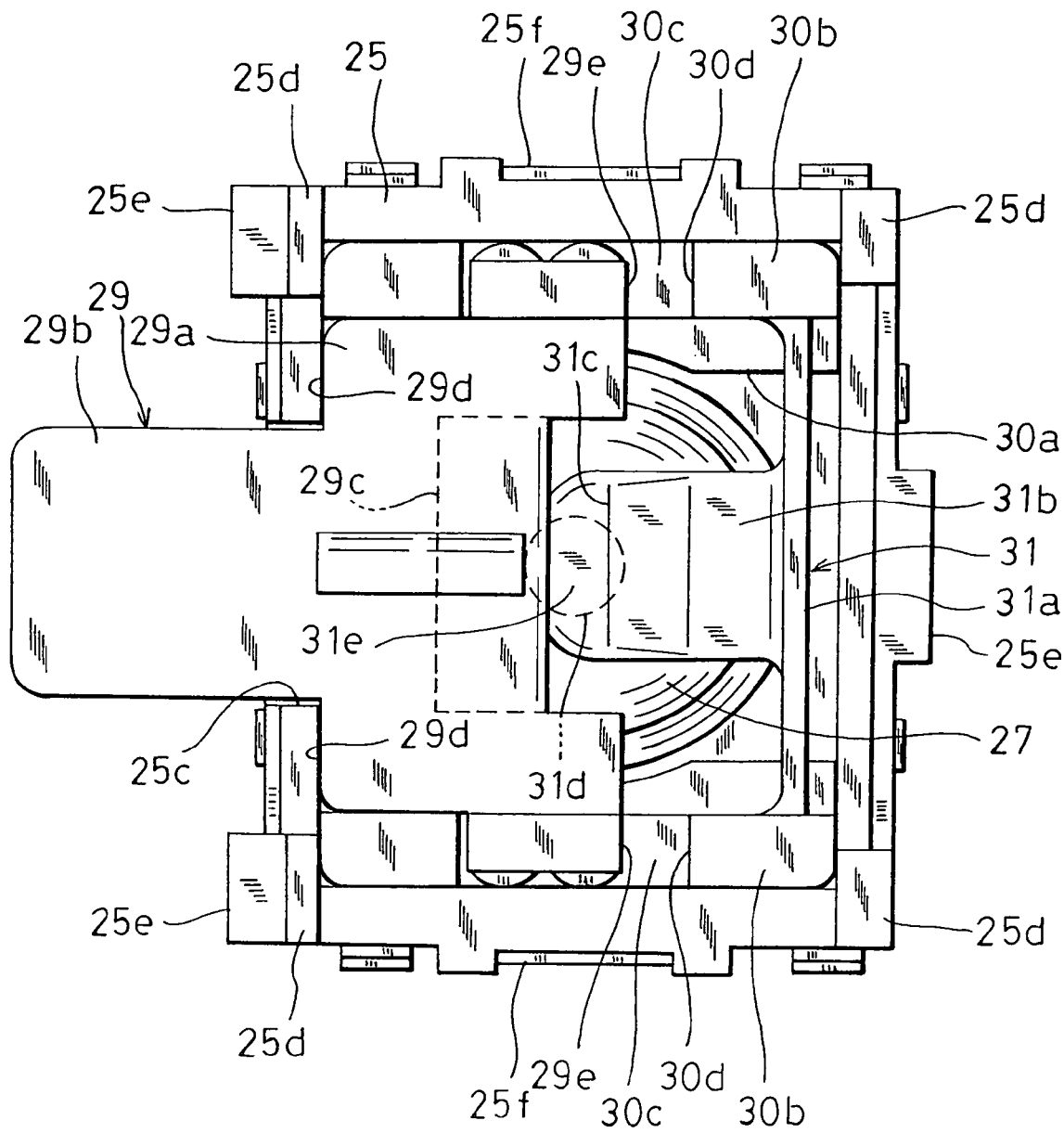
FIG. 10 is a plan view of a state where a cover is removed and showing the internal structure of the lateral pushing type push switch of FIG. 8.
Figure 11:
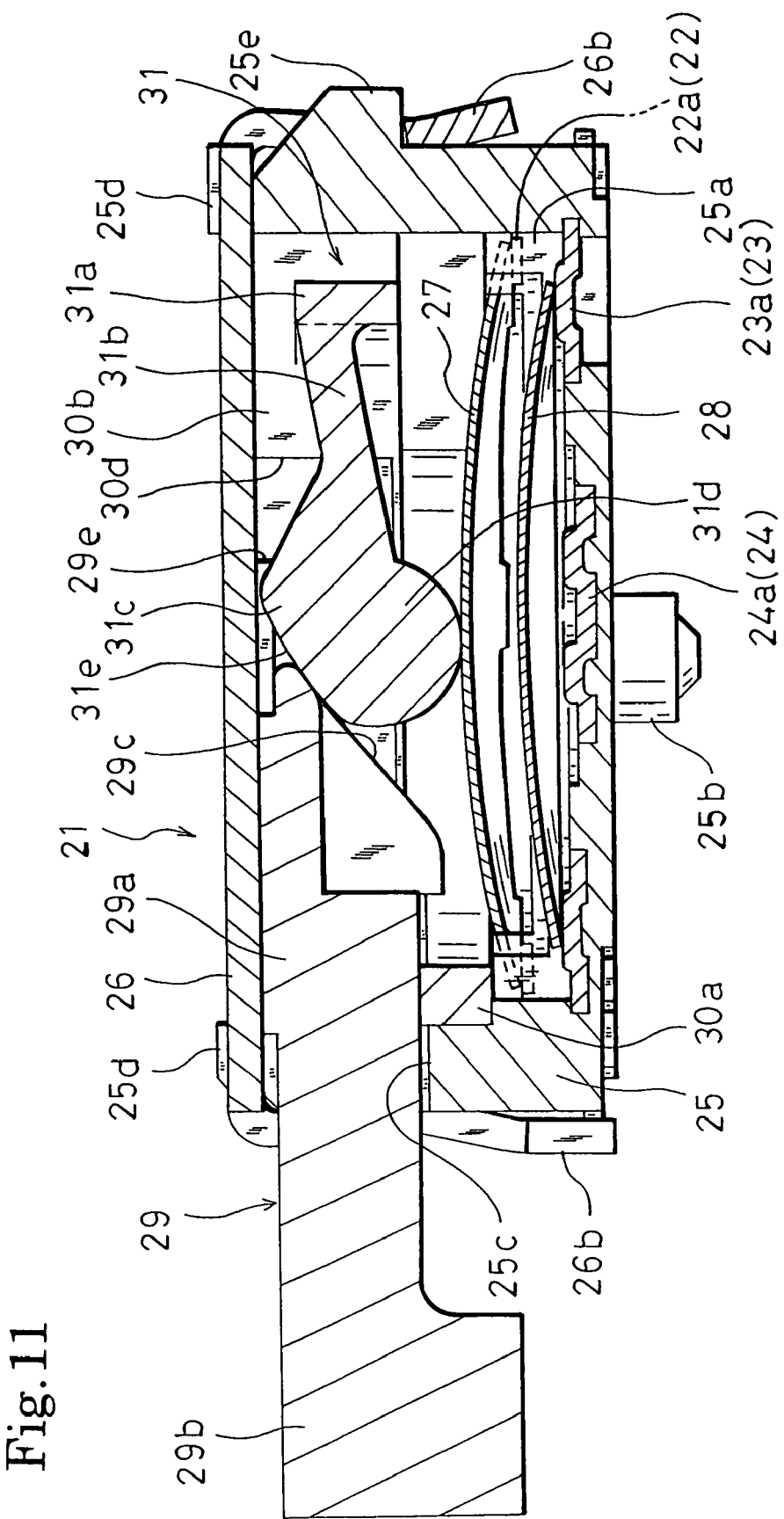
FIG. 11 is a section view showing the internal structure of the lateral pushing type push switch of FIG. 8.
Figure 12:
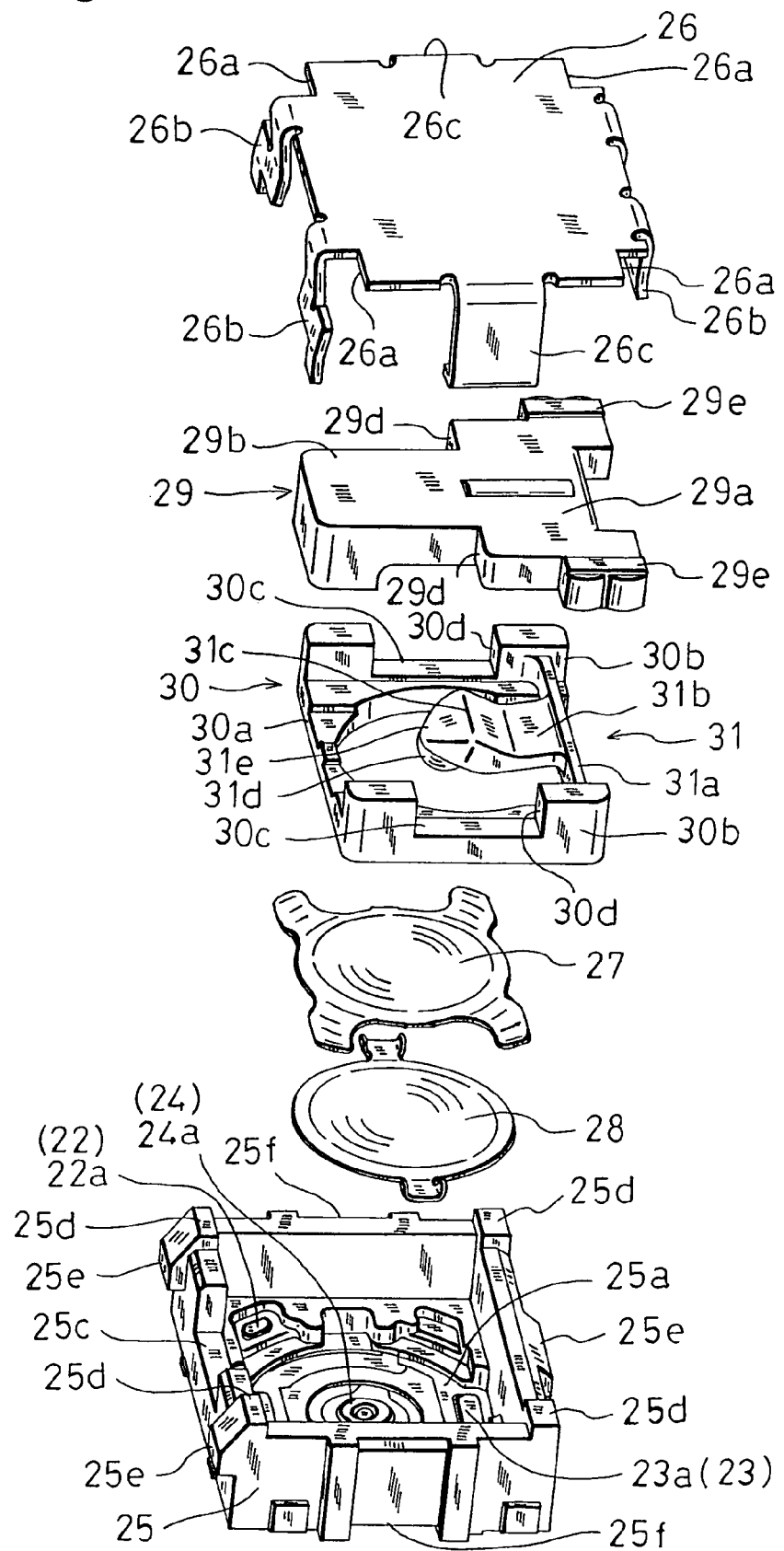
FIG. 12 is an assembly view of the lateral pushing type push switch of FIG. 8.
Figure 13:
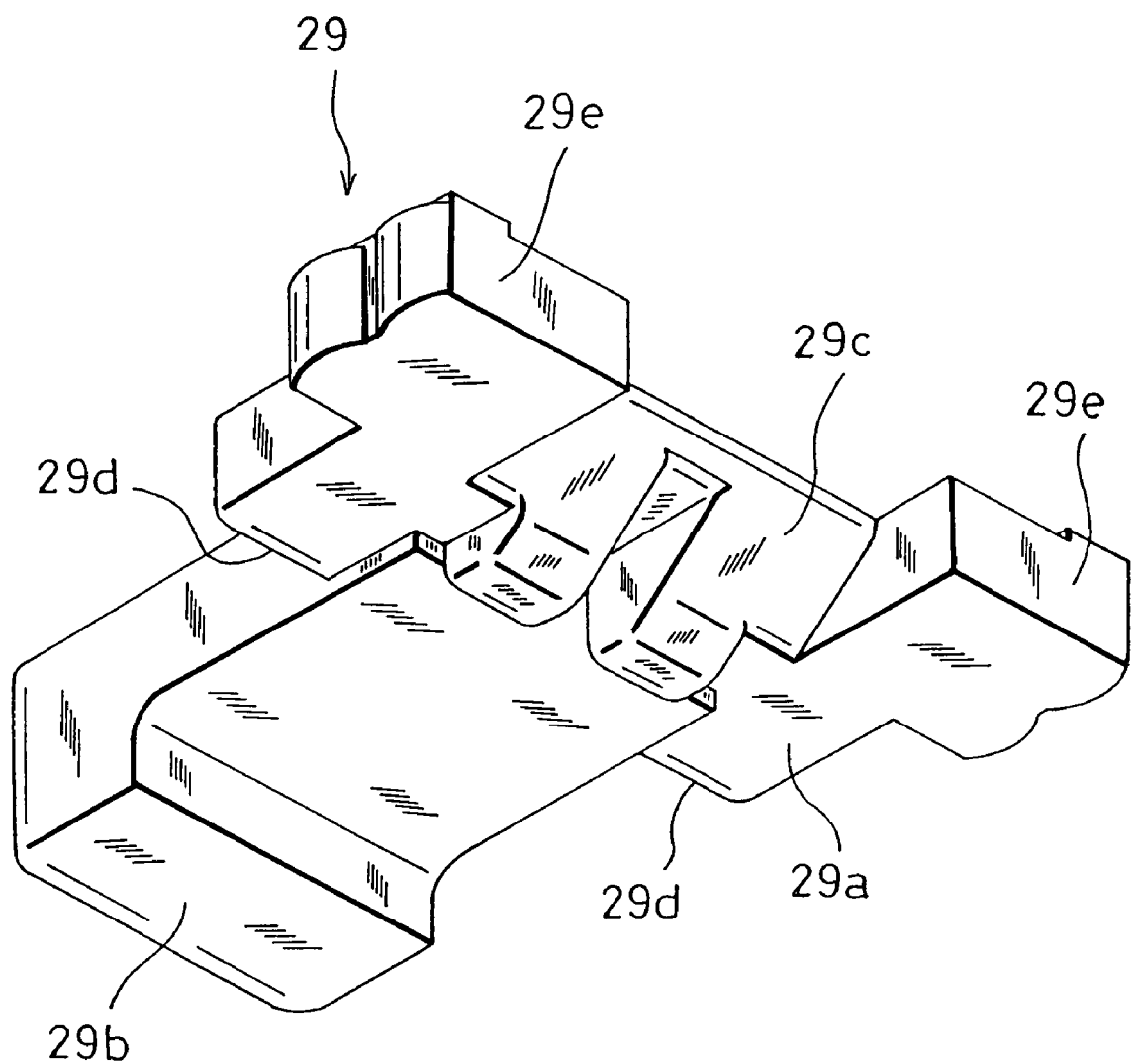
FIG. 13 is a perspective view of a push button disposed in the lateral pushing type push switch of FIG. 8, as viewed from the lower side.
Figure 14:
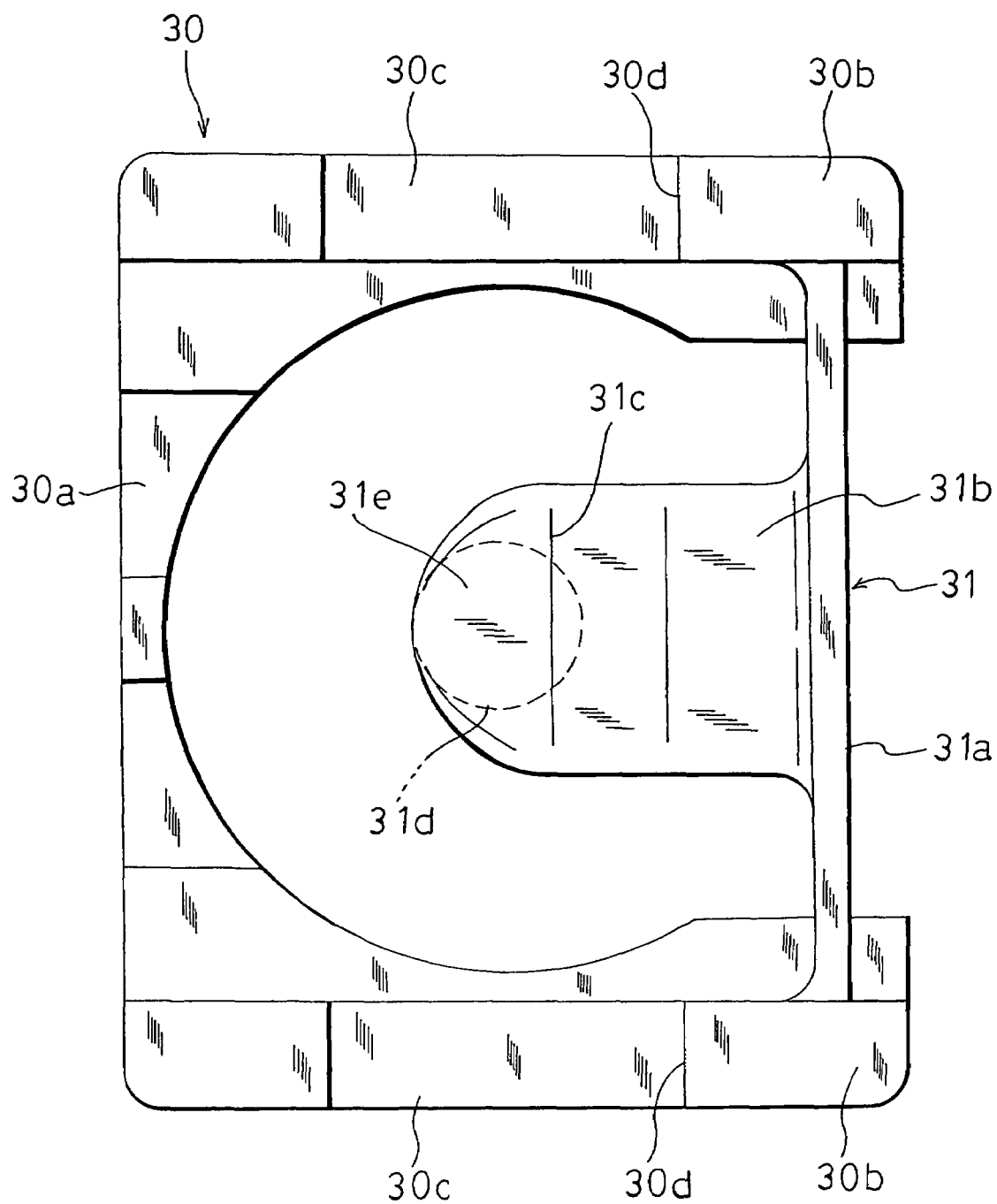
FIG. 14 is a plan view of a guide member and showing the structure of a presser disposed in the lateral pushing type push switch of FIG. 8.
Figure 15:
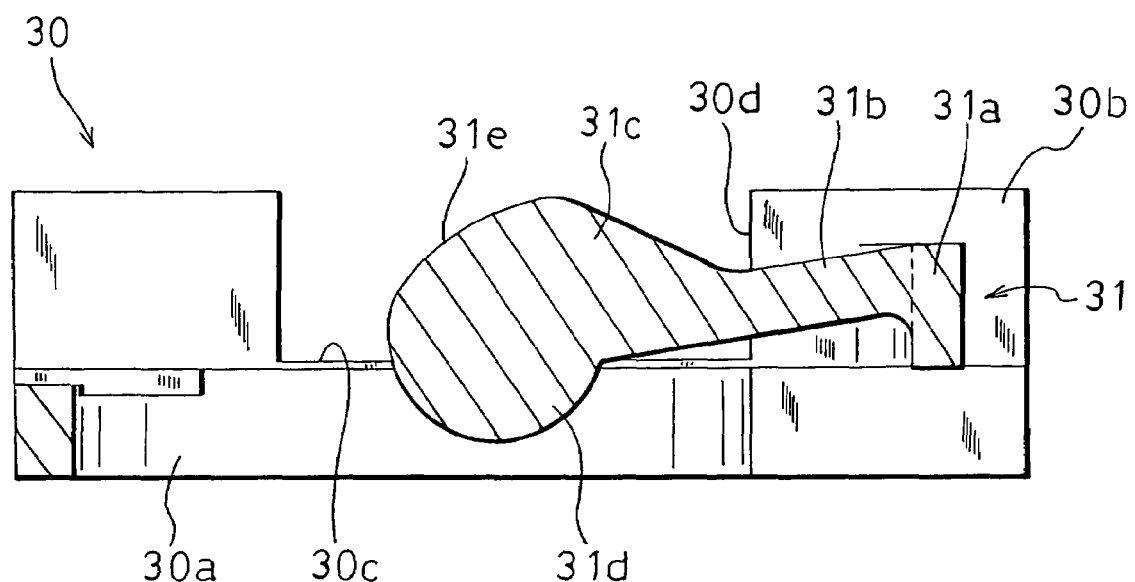
FIG. 15 is a section view showing the structure of the presser disposed in the lateral pushing type push switch of FIG. 8.

Next, a second embodiment of the lateral pushing type push switch of the invention will be described with reference to FIGS. 8 to 17. FIG. 8 is a plan view showing the appearance of the lateral pushing type push switch of the second embodiment, FIG. 9 is a side view showing the appearance of the lateral pushing type push switch, FIG. 10 is a plan view of a state where a cover is removed and showing the internal structure of the lateral pushing type push switch, FIG. 11 is a section view showing the internal structure of the lateral pushing type push switch, FIG. 12 is an assembly view of the lateral pushing type push switch, FIG. 13 is a perspective view of a push button disposed in the lateral pushing type push switch, as viewed from the lower side, FIG. 14 is a plan view of a guide member disposed in the lateral pushing type push switch, and FIG. 15 is a section view of the guide member disposed in the lateral pushing type push switch.

As shown in FIGS. 8 to 15, the lateral pushing type push switch 21 of the second embodiment is a switch of the two-step operation type in which two kinds of switch circuits are on/off operated in two steps. The switch is configured by: an insulative housing 25 which is made of a synthetic resin, and which is formed integrally with first, second, and third stationary contact terminals 22, 23, 24 by insert molding; a cover 26 which cooperates with the housing 25 to form a case of the lateral pushing type push switch 21; first and second elastic dome-like metal plates 27, 28 which are used as first and second movable contacts; an insulative push button 29 which is made of a synthetic resin, and which is pressingly operated in a lateral direction to perform a switch operation; an insulative guide member 30 which is made of a synthetic resin, and which laterally reciprocably supports the push button 29, and which stops the pressing on the push button 29 at a predetermined position; and an insulative presser 31 which is made of a synthetic resin, and which is formed integrally with the guide member 30, and which coverts the lateral pressing on the push button 29 to a force in a perpendicularly downward direction to transmit the force to the first and second dome-like metal plates 27, 28, thereby pressing down the first and second dome-like metal plates 27, 28 to cause the lateral pushing type push switch 21 to perform a two-step operation.

The housing 25 is formed into a box-like shape in which the upper face is opened. A stepped recess 25a is formed on the inner bottom face of the housing. The first, second, and third stationary contact terminals 22, 23, 24 are formed by punching and bending a highly conductive thin metal plate, and embedded in an insulation state in the bottom of the housing 25. In an outer peripheral step face of the stepped recess 25a, a part of the first stationary contact terminal 22 is exposed substantially flush therewith to form a common contact 22a serving as a first stationary contact. In a bottom face outer side of the stepped recess 25a, a part of the second stationary contact terminal 23 is exposed substantially flush therewith to form a first selection contact 23a serving as a second stationary contact. In a bottom face center portion of the stepped recess 25a, a part of the third stationary contact terminal 24 is exposed substantially flush therewith to form a second selection contact 24a serving as a third stationary contact. A part of each of the first, second, and third stationary contact terminals 22, 23, 24 is led out to the outside of the housing 25 to form an external connection terminal of the lateral pushing type push switch 21. The external connection terminals are to be surface-mounted by soldering to a printed circuit board which is not shown. Plural projections 25b which are used for positioning in mounting are downward protrudingly formed on the outer bottom face of the housing 25.

A recessed cutaway 25c for allowing the push button to be protruded is formed in one (in the embodiment, the left side wall) of the four or front, rear, right, and left side walls of the housing 25. Projections 25d which are upward protruded to be used for positioning the cover are formed in the four corners of the upper side, respectively. First engaging claws 25e for fixing the cover are outward protrudingly disposed on the outer faces of the right and left side walls, and engaging grooves 25f for fixing the cover are disposed so as to extend from the outer faces of the front and rear side walls to side portions of the outer bottom face.

The cover 26 covers the open upper face of the housing 25 to form the case of the lateral pushing type push switch 21. The cover 26 is formed by punching and bending a highly conductive metal plate. Cover-positioning cutaways 26a are disposed in the four corners. Elastic first engaging pieces 26b for fixing the cover are downward protrudingly disposed on the right and left side edges, and elastic second engaging pieces 26c for fixing the cover are protrudingly disposed on the front and rear side edges, respectively. When, in a final stage of assembling the lateral pushing type push switch 21, the open face of the housing 25 is covered by the cover 26, the cutaways 26a of the cover 26 are fitted onto the projections 25d of the housing 25, whereby the cover 26 is positioned in the open upper face of the housing 25. Lower portions of the first engaging pieces 26b are pressingly outward expanded by tapers disposed in upper portions of the first engaging claws 25e of the housing 25 to override the outer faces of the first engaging claws 25e, and, when passed over the first engaging claws 25e, are returned to the original shape, with result that the engaging pieces are engaged from below with the first engaging claws 25e while pressing the outer faces of the right and left side walls of the housing 25. Lower portions of the second engaging pieces 26c are pressingly outward expanded by tapers disposed in upper portions of the engaging grooves 25f of the housing 25 to be fitted into vertical portions of the engaging grooves 25f, and, when passed over the front and rear side walls of the housing 25, fitted into horizontal portions of the engaging grooves 25f to be returned to the original shape, with result that the whole engaging pieces are fitted into the engaging grooves 25f, and the lower portions are engaged from below with side portions of the outer bottom face of the housing 25 while the upper portions press the outer faces of the front and rear side walls of the housing 25. As a result, the cover 26 is fixed to the open upper face of the housing 25.

The first and second dome-like metal plates 27, 28 are formed by punching and bending a highly conductive thin metal plate. An outer peripheral portion of the first dome-like metal plate 27 is supported by the outer peripheral step face of the stepped recess 25a, and that of the second dome-like metal plate 28 is supported by the bottom face of the outer peripheral portion of the stepped recess 25a, so that the first and second dome-like metal plates 27, 28 are disposed in two or upper and lower stages on the stepped recess 25a. The outer peripheral portion of the first dome-like metal plate 27 is always in contact with the common contact 22a. The outer peripheral portion of the second dome-like metal plate 28 is always in contact with the first selection contact 23a, and a center portion is opposed to the second selection contact 24a.

In the push button 29, a pressing plate 29a having a U-like shape in a plan view, a plate-like operating portion 29b which is protruded from a middle portion of the outer side face of an intermediate piece of the pressing plate 29a, a press-down portion 29c formed by a flat inclined face which is formed by obliquely downward inclining the inner side face of the intermediate piece of the pressing plate 29a, stoppers 29d which are formed by both end portions of the outer side face of the intermediate piece of the pressing plate 29a, and which function in the returning process, and movable stoppers 29e which are formed by projections that are outward protruded from outer side faces of tip ends of both end edges of the pressing plate 29a, and which function in the pressing process are integrally formed. In the push button 29, the pressing plate 29a is substantially horizontally supported in an upper inner portion of the housing 25 by the guide member 30, and the operating portion 29b is substantially horizontally protruded to the outer left side of the housing 25 through the cutaway 25c, thereby allowing the operating portion 29b to be rightward pressed by laterally pressing the operating portion 29b. The return stoppers 29d are opposed to the inner face of the left side wall of the housing 25 which is on the both sides of the cutaway 25c.

In the guide member 30, a base plate portion 30a which is overlapped on the inner bottom face outside the stepped recess 25a of the housing 25 so as not to cover the first dome-like metal plate 27, and which is formed into a U-like shape in a plan view, and a pair of guide wall portions 30b which are raised from outer edges of both edge portions of the base plate portion 30a, and which are overlapped on the inner side of the front and rear side walls of the housing 25 are integrally formed. In a state where the outer peripheral faces of the base plate portion 30a and the guide wall portions 30b are in contact with the inner faces of the four or front, rear, right, and left side walls of the housing 25, and the lower face of the base plate portion 30a is supported by the inner bottom face outside the stepped recess 25a of the housing 25, upper portions of the guide wall portions 30b are pressed by the cover 26, and the guide member 30 is housed and fixed into the housing 25.

A recessed cutaway 30c for defining the press stroke (operation stroke of the switch) of the push button 29 is disposed in each of the guide wall portions 30b of the guide member 30. The side end face of each cutaway 30c which is in the inner side in the pressing direction of the push button 29 is formed as a stationary stopper 30d for stopping the pressing on the push button 29.

In the guide member 30, the upper face of the pressing plate 29a of the push button 29 is pressed by the cover 26, the movable stoppers 29e of the push button 29 are fitted into the cutaways 30c, the pressing plate 29a of the push button 29 is interposed between the guide wall portions 30b, the lower face of the pressing plate 29a of the push button 29 is supported by the upper face of the base plate portion 30a, and the both outer side faces of the pressing plate 29a of the push button 29 are supported by the inner faces of the guide wall portions 30b, whereby the push button 29 is reciprocably supported in a lateral direction extending along the pressing direction. At the end of the press stroke of the push button 29, the movable stoppers 29e of the push button 29 butt against the stationary stoppers 30d, thereby stopping the pressing on the push button 29.

In the presser 31, a flexible thin plate-like swing fulcrum portion 31a which is twistingly deformable, and a flexible cantilevered hinge portion 31b which is vertically flexurally deformable are integrally formed in a T-like shape with the guide member 30. The both ends of the swing fulcrum portion are fixed with being integrally coupled to the guide wall portions 30b which are inner in the pressing direction of the push button 29 than the cutaways 30c of the guide member 30. The swing fulcrum portion is bridged between the guide wall portions 30b. The hinge portion is supported by the swing fulcrum portion 31a while one end portion is integrally coupled to a middle portion of the inner face of the swing fulcrum portion 31a, and extended substantially perpendicularly from the middle portion of the inner face of the swing fulcrum portion 31a toward the press-down portion 29c of the push button 29. The presser has two fixed ends (both ends of the swing fulcrum portion 31a), and one free end (tip end of the hinge portion 31b).

In a tip end portion of the hinge portion 31b, a mountain-like upper projection 31c which is upward protruded, and a semispherical lower projection 31d which is downward protruded are integrally formed. An inclined face which is downward inclined from the top of the upper projection 31c toward the tip end of the hinge portion 31b is in contact from below with the press-down portion 29c of the push button 29. A lower portion of the lower projection 31d butts against a substantially center portion of the upper face of the first dome-like metal plate 27. The inclined face of the upper projection 31c which is in contact with the press-down portion 29c of the push button 29 is formed as an inclined portion 31e which is formed integrally with the free end of the presser 31, and which converts pressing of the push button 29 to a force in the downward perpendicular direction.

In order to allow the inclined portion 31e to be in contact with and slid over the flat (linear) press-down portion 29c of the push button 29 not by a surface but by a line, the inclined portion 31e is rounded.

As shown in FIG. 12, the lateral pushing type push switch 21 of the second embodiment is assembled in the following manner. The first and second dome-like metal plates 27, 28 are disposed in two or upper and lower stages in the stepped recess 25a of the housing 25. Then, the guide member 30 in which the stationary stoppers 30d and the presser 31 are integrally formed is placed on the inner bottom face which is outside the stepped recess 25a. While the operating portion 29b of the push button 29 is fitted into the cutaway 25c of the housing 25, and the movable stoppers 29e of the push button 29 are fitted into the cutaways 30c of the guide member 30, the pressing plate 29a of the push button 29 is fitted between the guide wall portions 30b of the guide member 30, thereby mounting the push button 29. Finally, the cover 26 is fitted from above to the housing 25 to be positioned and engaged therewith, thereby completing the assembling process.

Figure 16:
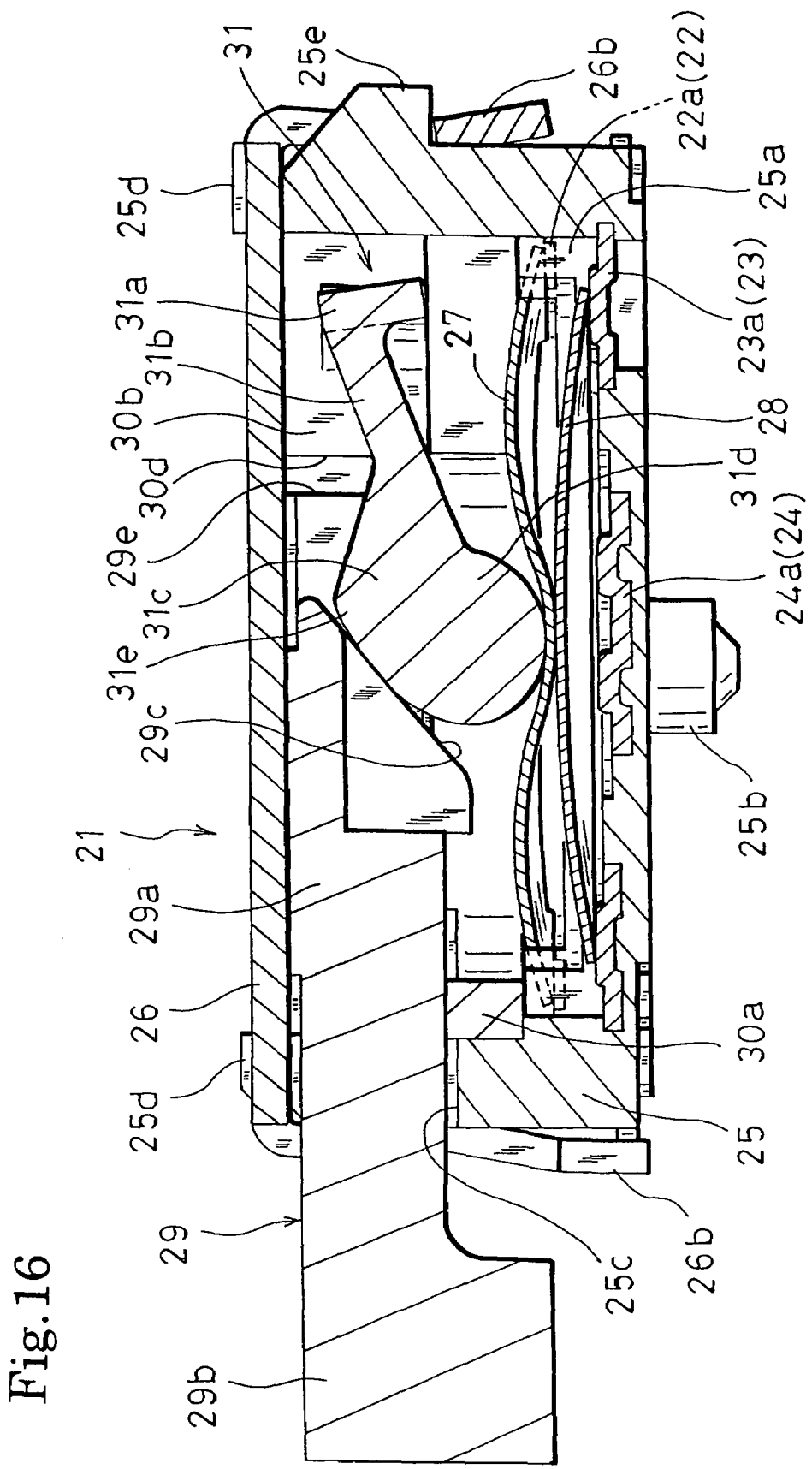
FIG. 16 is a section view showing a state after a first step switch of the lateral pushing type push switch of FIG. 8 is operated.
Figure 17:
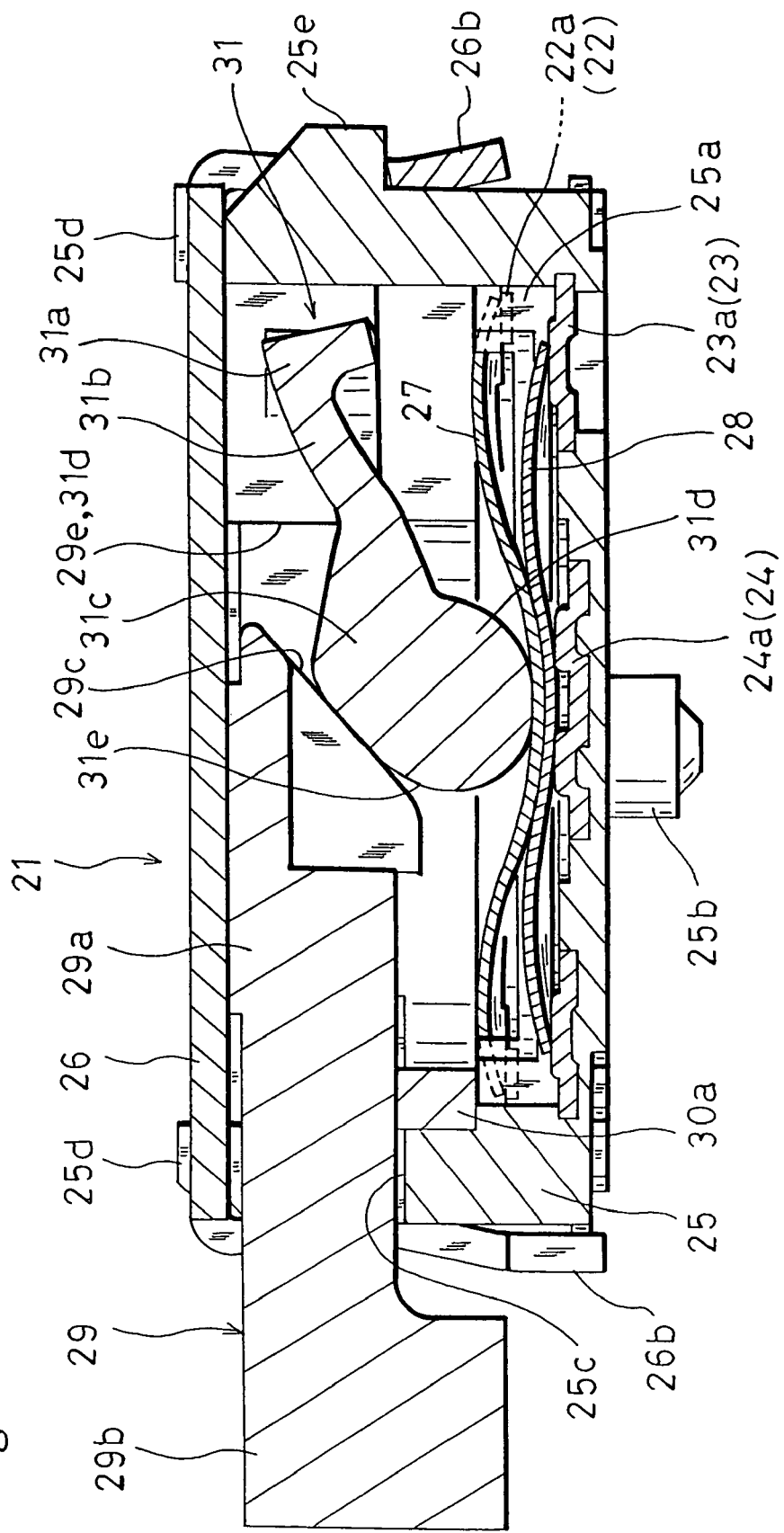
FIG. 17 is a section view showing a state after a second step switch of the lateral pushing type push switch of FIG. 8 is operated.

FIG. 16 is a section view showing a state after the first step switch of the lateral pushing type push switch of the second embodiment is operated (after the first dome-like metal plate is operated), and FIG. 17 is a section view showing a state after the second step switch of the lateral pushing type push switch of an embodiment of the invention is operated (after the second dome-like metal plate is operated). Next, the operation of the lateral pushing type push switch 21 of the second embodiment will be described with reference to FIGS. 11, 16, and 17.

FIG. 11 shows a state before the lateral pushing type push 21 is operated. In a pre-operation or free state in which the push button 29 is not operated, the push button 29 is located at a position where the return stoppers 29d butt against the inner faces of the left side wall on the both sides of the cutaway 25c of the housing 25, the pressing movable stoppers 29e are positioned in left end portions in the cutaways 30c of the guide member 30, and separated from the stationary stoppers 30d, and the press-down portion 29c does not press the inclined portion 31e of the presser 31. Therefore, the swing fulcrum portion 31a and the hinge portion 31b receive substantially no external force, and the presser 31 is in a substantially free state.

The first and second dome-like metal plates 27, 28 are separated from each other in an upward inflated free state, and the center portion of the second dome-like metal plate 28 is separated from and opposed to the second selection contact 24a.

When, in this free state, the operating portion 29b of the push button 29 is laterally pressed in the right direction of FIG. 11, the press-down portion 29c of the push button 29 is rightward moved to slide over the inclined portion 31e of the contacting presser 31 while pressing the portion in the right direction as shown in FIG. 16. In accordance with this, the lateral pressure of the push button 29 is converted to a force in a perpendicularly downward direction to transmit the force to the free end of the presser 31. First, the presser 31 is swung in a counterclockwise direction about the swing fulcrum portion 31a while twistingly deforming the swing fulcrum portion 31a in a counterclockwise direction, and the free end is downward pressed. Therefore, a substantially center portion of the upper face of the first dome-like metal plate 27 is pressed down by the lower projection 31d of the free end.

This causes the first dome-like metal plate 27 to be inverted to the downward direction, and in contact with the second dome-like metal plate 28 which is in the lower side. Therefore, the common contact 22a and the first selection contact 23a become electrically conductive with each other through the first and second dome-like metal plates 27, 28, and the first switch of the first step is turned on.

Then, when the operating portion 29b of the push button 29 is further laterally pressed in the right direction, the pressdown portion 29c of the push button 29 is further moved in the right direction to slide over the inclined portion 31e of the contacting presser 31 while further rightward pressing the inclined portion as shown in FIG. 17. In accordance with this, the presser 31 is further swung in a counterclockwise direction about the swing fulcrum portion 31a while further twistingly deforming the swing fulcrum portion 31a in a counterclockwise direction, and the free end is downward pressed while flexurally deforming the hinge portion 31b. Therefore, a substantially center portion of the upper face of the second dome-like metal plate 28 is pressed down together with the first dome-like metal plate 27 by the lower projection 31d of the free end.

This causes the second dome-like metal plate 28 to be inverted to the downward direction, and in contact with the second selection contact 24a which is under the center portion. Therefore, the common contact 22a and the second selection contact 24a become electrically conductive with each other through the first and second dome-like metal plates 27, 28, and the second switch of the second step is turned on following the first switch of the first step.

At this time, the movable stoppers 29e of the push button 29 are moved to the right end portions in the cutaways 30c of the guide member 30, and bumps against the stationary stoppers 30d of the guide member 30 to be received thereby to stop the lateral pressing on the push button 29, thereby accurately limiting excess pressing (overstroke) on the push button 29 which causes reductions of the durabilities of the presser 31 and the first and second dome-like metal plates 27, 28. During a period when the operating portion 29b of the push button 29 is pressed and the second dome-like metal plate 28 is in contact with the second selection contact 24a, the on states of the first and second switches are maintained.

When, in this state where the first and second switches are turned on, the lateral press operating force on the push button 29 is released, the first and second dome-like metal plates 27, 28 are inverted to the upward direction by their elastic forces to return to their original free states, and also the presser 31 is returned to its original free state by the elastic returning forces of the hinge portion 31b and the swing fulcrum portion 31a. In accordance with this, also the push button 29 is returned to its original position, and to the free state before the switch operation shown in FIG. 11. In returning to the free state, at the timing when the contact between the second dome-like metal plate 28 and the second selection contact 24a is broken, the second switch is turned off, and, at the timing when the contact between the first and second dome-like metal plates 27, 28 is broken, the first switch is turned off.

As apparent from the above, the lateral pushing type push switch 21 of the second embodiment is a lateral pushing type push switch of the two-step operation type in which the two or first and second dome-like metal plates 27, 28 are disposed in two or upper and lower stages, and the first and second dome-like metal plates 27, 28 are pressed down by lateral pressing the push button 29. Although the operation stroke of the switch is longer than that of a lateral pushing type push switch of the one-step operation type, the switch has the following advantage. The switch comprises the flexible T-like presser 31 having two fixed ends and one free end. The free end of the presser 31 is in contact with the push button 29. The inclined portion 31e which coverts the pressing on the push button 29 to a force in a perpendicular direction is formed in the free end of the presser 31. While the swing fulcrum portion 31a between the two fixed ends of the presser 31 is twistingly deformed by the pressing on the push button 29, the first and second dome-like metal plates 27, 28 are pressed down by the free end of the presser 31. Therefore, the deformation amount of the whole presser 31 can be reduced (as compared with a presser having a simple cantilever structure), and a stress produced in the presser 31 can be reduced. Therefore, the durability of the presser 31 can be improved without enlarging the external shape of the presser 31.

The inclined portion 31e of the presser 31 is rounded, and slides over the push button 29 while being in line contact therewith. Therefore, sliding friction between the push button 29 and the free end of the presser 31 is reduced (as compared with surface contact), so that wear of sliding portions of the push button 29 and the free end of the presser 31 can be suppressed, and a stable press stroke (operation stroke of the switch) of the first and second dome-like metal plates 27, 28 can be obtained. Consequently, excellent operation properties of the first and second dome-like metal plates 27, 28 (excellent operation properties of the switch) can be obtained until the life of the switch ends.

The presser 31 is integrally formed with being coupled by the two fixed ends of the presser 31 to the guide member 30 which laterally reciprocably supports the push button 29. Therefore, positional accuracies of the push button 29 and the presser 31 can be easily ensured, and therefore it is possible to obtain stable press strokes of the first and second dome-like metal plates 27, 28. As a result, excellent operation properties of the first and second dome-like metal plates 27, 28 can be obtained until the life of the switch ends.

The movable stoppers 29e are formed integrally with the push button 29, and the stationary stopper 30d against which the movable stoppers 29e of the push button 29 butt to stop the pressing on the push button 29 at a predetermined position is formed integrally with the guide member 30. Therefore, excess pressing (overstroke) on the push button 29 can be accurately limited. According to the configuration, reductions of the durabilities of the presser 31 and the first and second dome-like metal plates 27, 28 due to excessive pressing on the push button 29 can be prevented from occurring, and excellent operation properties of the first and second dome-like metal plates 27, 28 can be obtained until the life of the switch ends.

Therefore, the lateral pushing type push switch 21 of the second embodiment is a small and thin lateral pushing type push switch of the two-operation type in which the life can be easily prolonged, and excellent operation properties can be obtained until the life of the switch ends.

Figure 18:
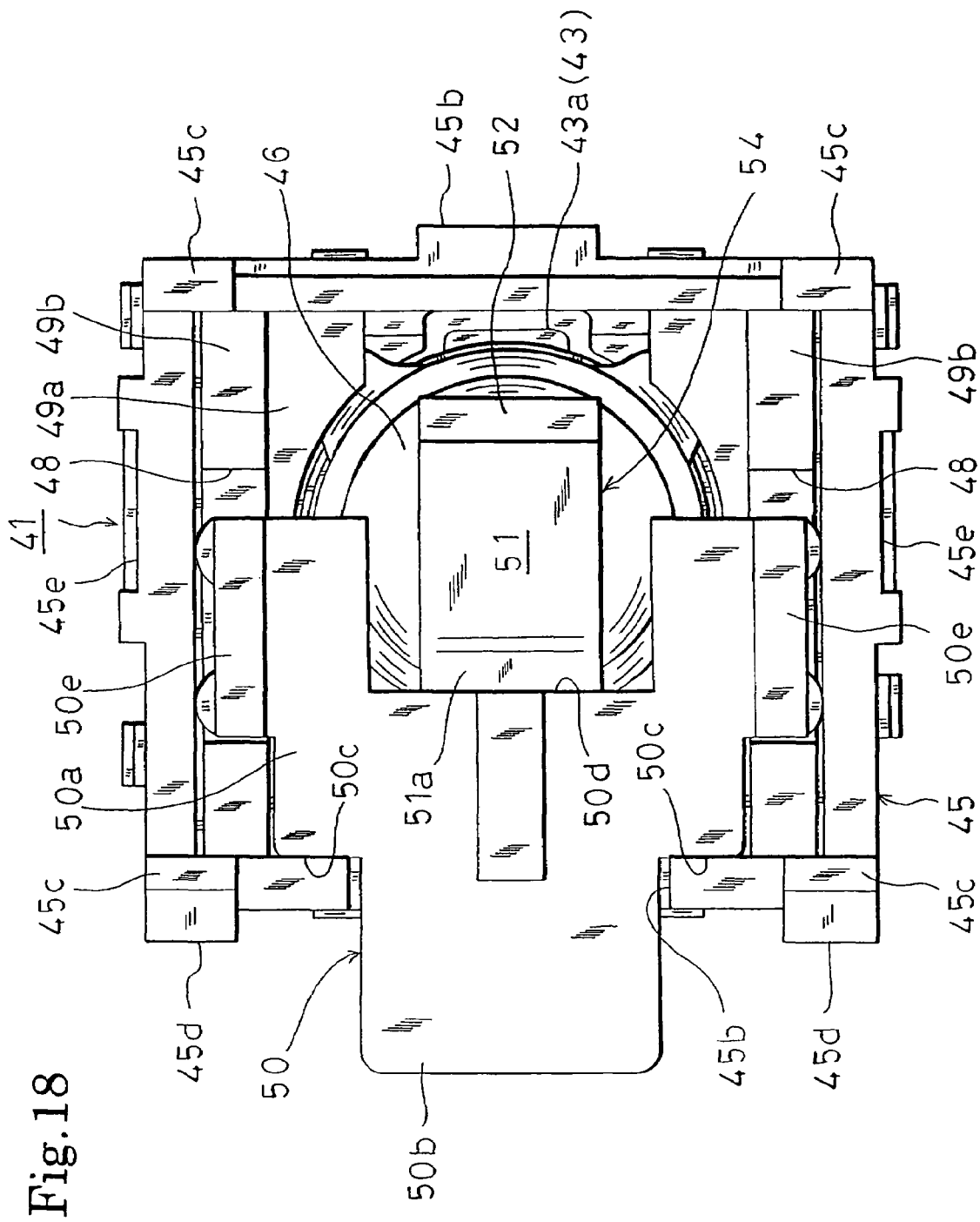
FIG. 18 is a plan view of a lateral pushing type push switch of a third embodiment of the invention.

Next, a third embodiment of the lateral pushing type push switch of the invention will be described with reference to FIGS. 18 and 19. FIG. 18 is a plan view of the lateral pushing type push switch of the third embodiment, FIG. 19 is a section view of the lateral pushing type push switch, and FIG. 20 is an assembly view of the lateral pushing type push switch.

Figure 19:
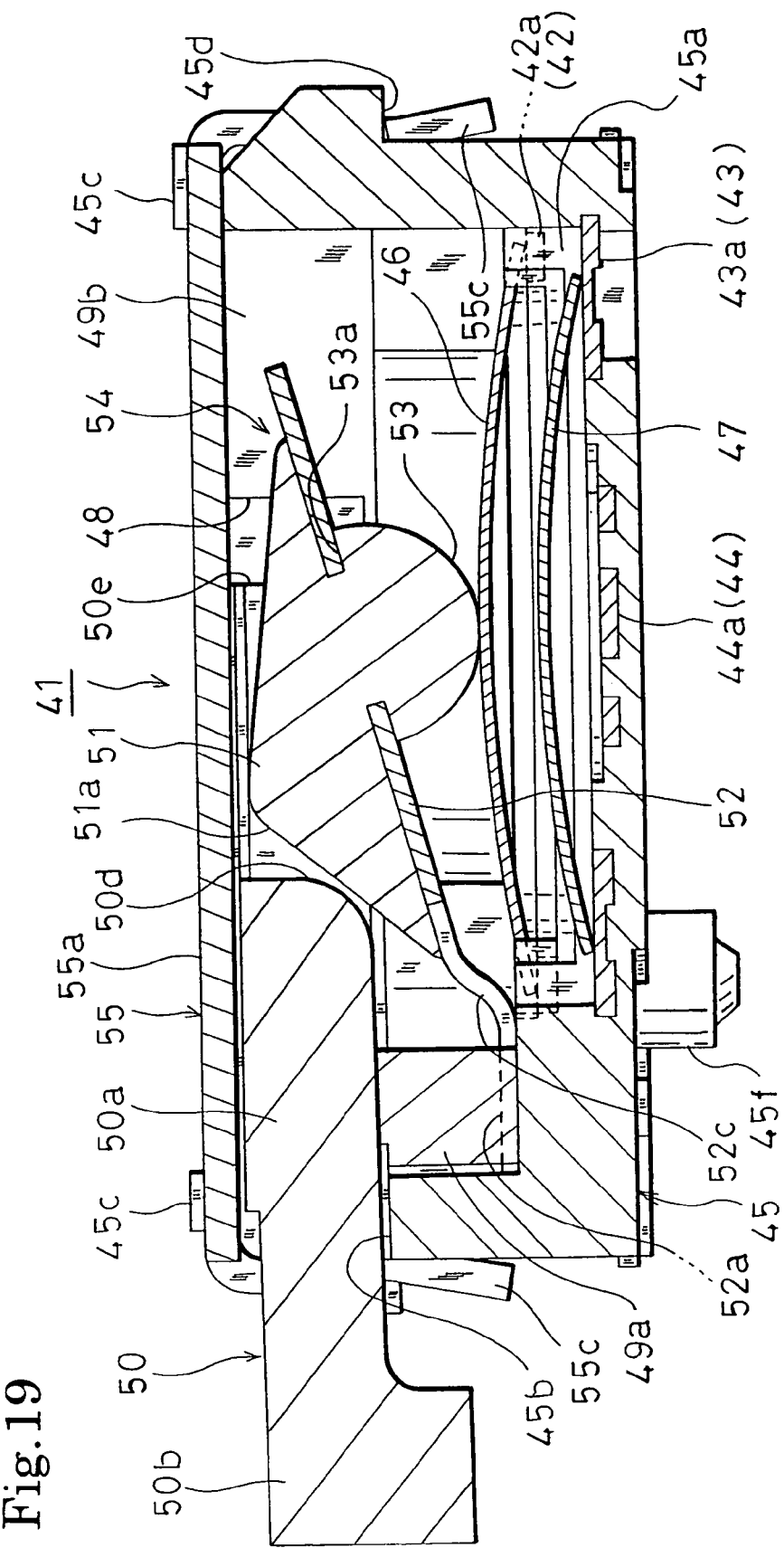
FIG. 19 is a section view showing a state before the lateral pushing type push switch of FIG. 18 is operated.
Figure 20:
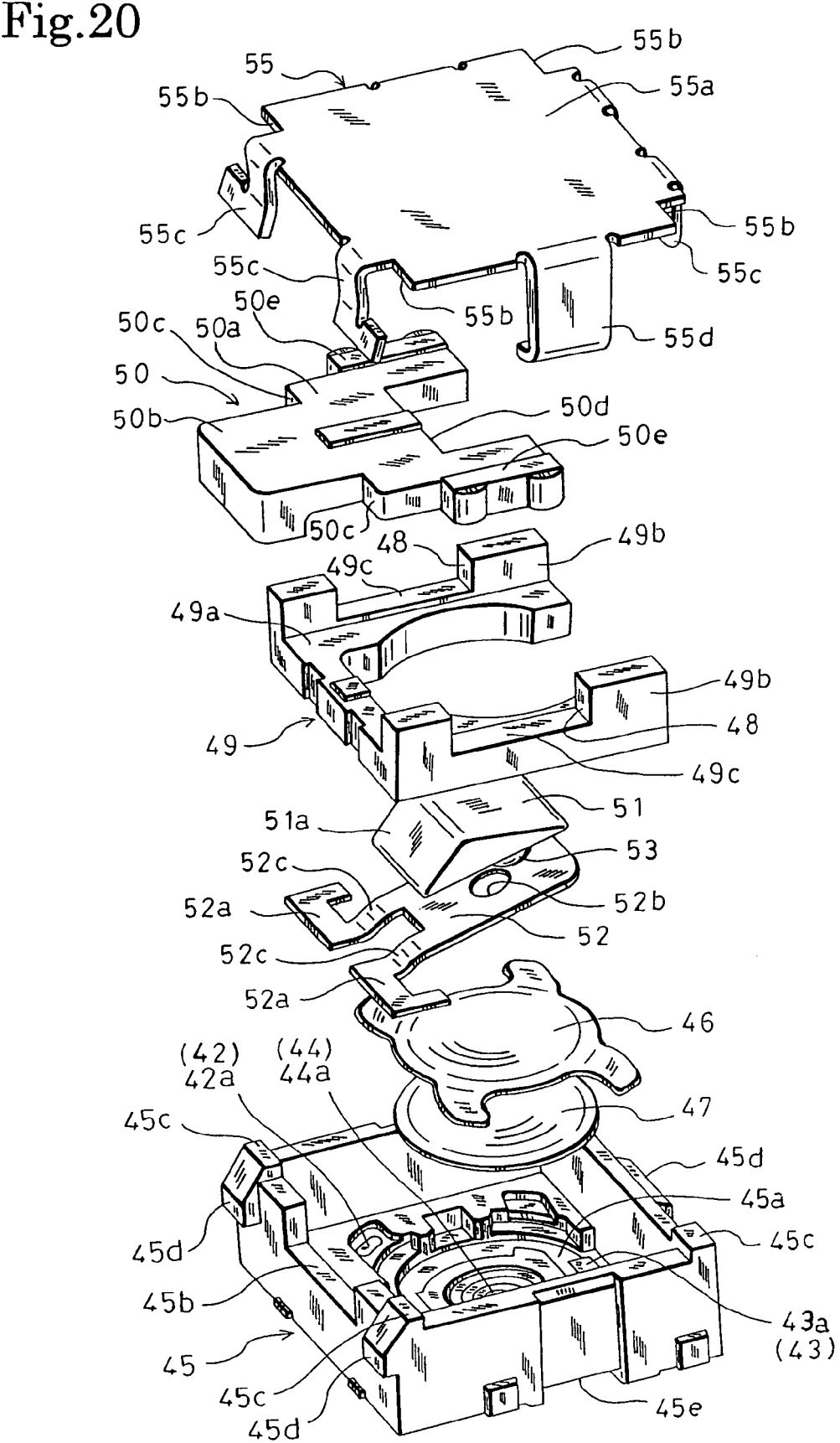
FIG. 20 is an assembly view of the lateral pushing type push switch of FIG. 18.

As shown in FIGS. 18 to 20, the lateral pushing type push switch 41 of the third embodiment is a switch of the two-step operation type in which two kinds of switch circuits are on/off operated in two steps. The switch is configured by: an insulative housing 45 which is made of a synthetic resin, and which is formed integrally with three or first, second, and third stationary contact terminals 42, 43, 44 by insert molding or the like; two or first and second elastic dome-like metal plates 46, 47 which are used as two or first and second movable contacts; an insulative guide member 49 which is made of a synthetic resin, and in which a stationary stopper 48 is integrally formed; an insulative push button 50 which is made of a synthetic resin, and which is pressingly operated in a lateral direction; a presser 54 having: an inclined portion 51 which converts the operating force in the moving direction of the push button 50, to a force in the operation direction of the first and second dome-like metal plates 46, 47; a flexible hinge portion 52 which allows the inclined portion 51 to be moved in the operation direction of the dome-like metal plates 46, 47; and a pressing portion 53 which presses down the dome-like metal plates 46, 47; and a cover 55 which cooperates with the housing 45 to form a switch case.

The housing 45 is formed into a box-like shape in which the upper face is opened. A stepped recess 45a is formed on the inner bottom face. In an outer peripheral step face of the stepped recess 45a, a part of the first stationary contact terminal 42 is exposed substantially flush therewith to form a common contact 42a serving as a first stationary contact. In a bottom face outer side of the stepped recess 45a, a part of the second stationary contact terminal 43 is exposed substantially flush therewith to form a first selection contact 43a serving as a second stationary contact. In a bottom face center portion of the stepped recess 45a, a part of the third stationary contact terminal 44 is exposed substantially flush therewith to form a second selection contact 44a serving as a third stationary contact.

The stationary contact terminals 42, 43, 44 are formed by punching and bending an electrically conductive thin metal plate. One end of each of the stationary contact terminals 42, 43, 44 is led out to the outside of the housing 45 to form an external connection terminal (not shown) for surface-mounting the lateral pushing type push switch 41. The external connection terminals are to be fixed and connected by soldering to a printed circuit board which is not shown.

A recessed cutaway 45b for allowing the push button to be protruded is formed in a middle upper portion of one (left side wall) of the four side walls of the housing 45. Projections 45c which are upward protruded to be used for positioning the cover are formed in the four corners of the upper face side of the housing 45, respectively. Engaging claws 45d and engaging grooves 45e for fixing the cover are formed in the four side walls of the housing 45. The engaging claws 45d are outward protruded from upper portions of the both ends of the side wall in which the cutaway 45b is formed, and an upper middle portion of the outer face of the side wall that is opposed to that side wall. The engaging grooves 45e are formed in middle portions of the outer faces of the remaining two side walls that are opposed to each other. Lower end portions of the engaging grooves 45e are inward bent along the outer bottom face of the housing 45. A positioning projection 45f for positioning with respect to the printed circuit board which is not shown is formed on the outer bottom face of the housing 45.

The first and second dome-like metal plates 46, 47 are formed by an electrically conductive thin metal plate (spring metal material). The first dome-like metal plate 46 is supported by the outer peripheral step face of the stepped recess 45a, and the second dome-like metal plate 47 is supported by the bottom face of the stepped recess 45a, so that the two or first and second dome-like metal plates 46, 47 are disposed in two or upper and lower stages in the stepped recess 45a of the housing 45. An outer side portion of the first dome-like metal plate 46 is always in contact with the common contact 42a. The outer side portion of the second dome-like metal plate 47 is always in contact with the first selection contact 43a, and a center portion of the second dome-like metal plate 47 is opposed to the second selection contact 44a.

Figure 21A:
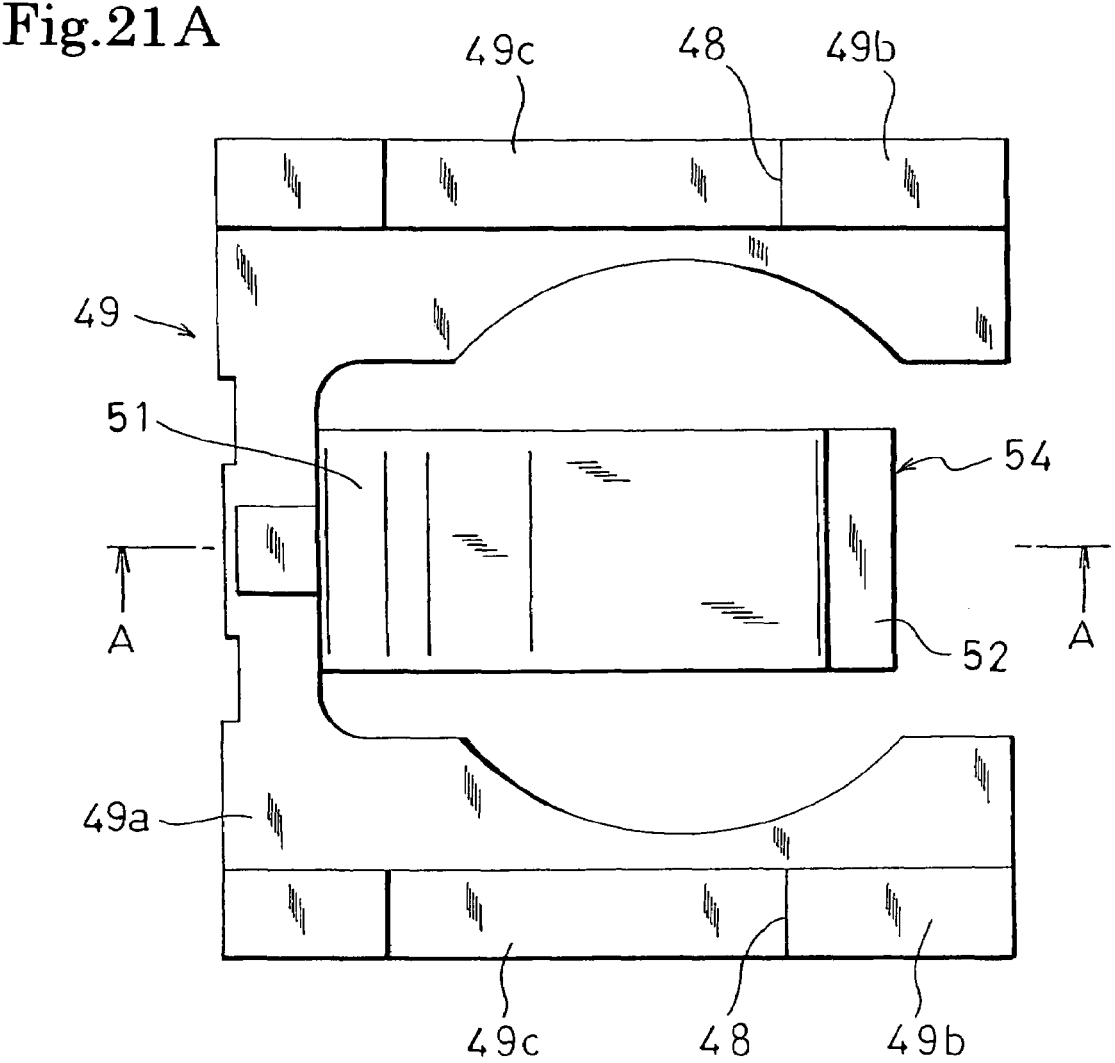
FIG. 21(A) is a plan view of a guide member and a presser in an assembled state of the lateral pushing type push switch of FIG. 18.
Figure 21B:
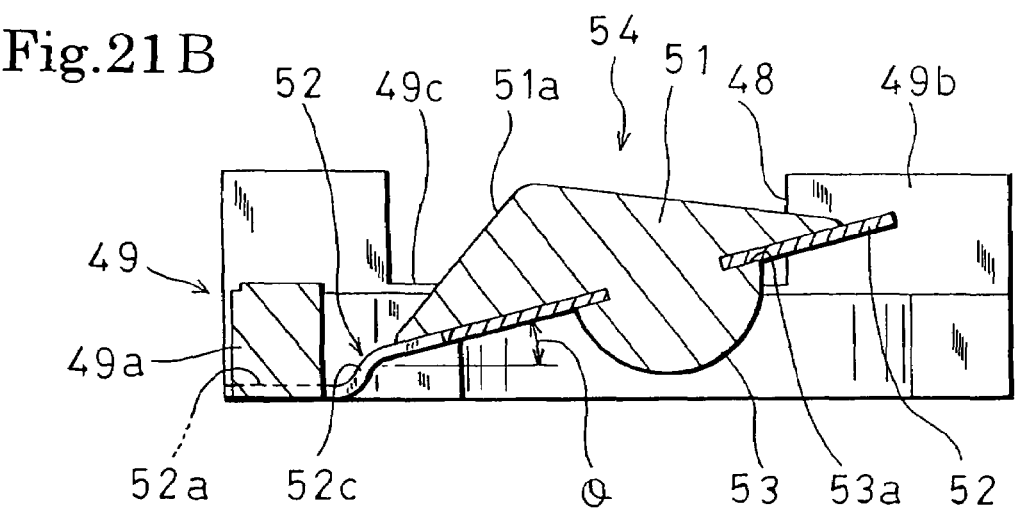
FIG. 21(B) is a section view taken along the line A-A of FIG. 21(A).
Figure 22A:
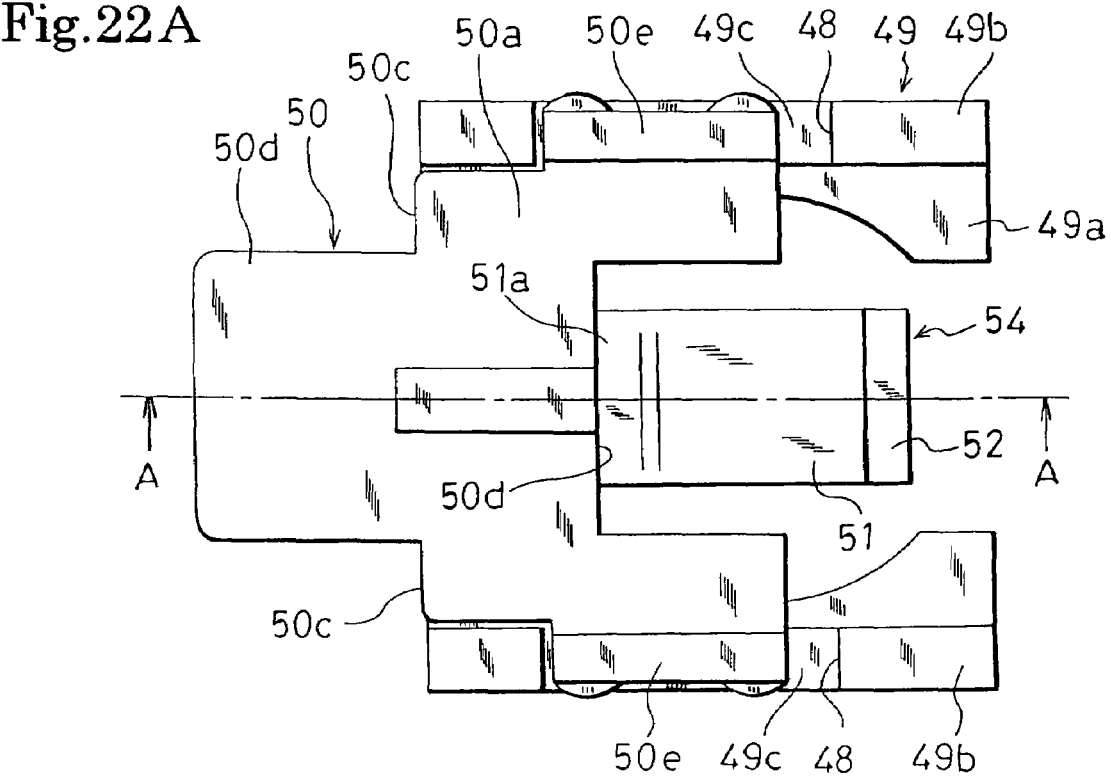
FIG. 22(A) is a plan view of a push button, the guide member, and the presser in the assembled state of the lateral pushing type push switch of FIG. 18.
Figure 22B:
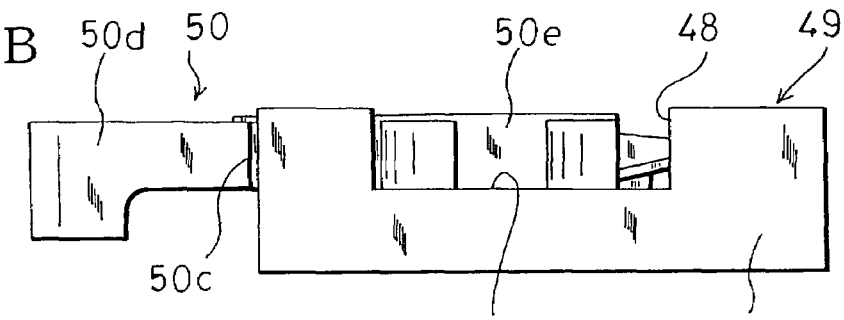
FIG. 22(B) is a bottom view of FIG. 22(A)
Figure 22C:
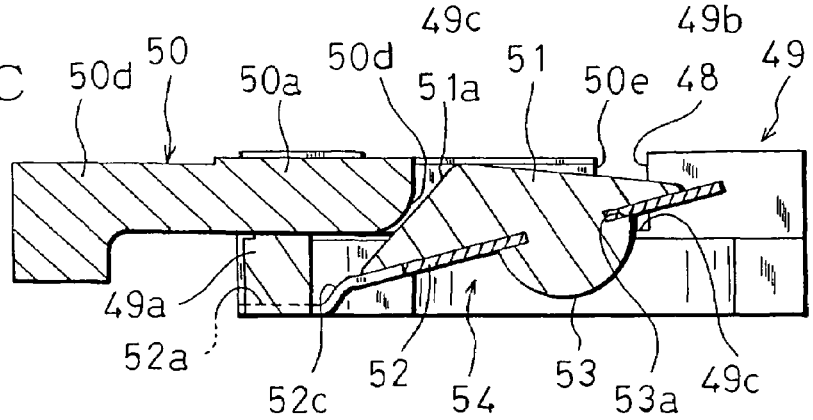
FIG. 22(C) is a section view taken along the line A-A of FIG. 22(A).

FIG. 21(A) is a plan view of the guide member and the presser in an assembled state, FIG. 21(B) is a section view taken along the line A-A of FIG. 21(A), FIG. 22(A) is a plan view of the push button, the guide member, and the presser in the assembled state, FIG. 22(B) is a bottom view of FIG. 22(A), and FIG. 22(C) is a section view taken along the line A-A of FIG. 22(A).

As shown in FIGS. 18 to 22, in the guide member 49, a base plate portion 49a which is formed into a U-like shape in a plan view, and guide wall portions 49b which are raised from outer edges of both edge portions of the base plate portion 49a are integrally formed. In a state where the outer side face of an intermediate edge of the base plate portion 49a is in contact with the lower inner face of the side wall in which the cutaway 45b of the housing 45 is formed, the outer side faces of the both edge portions of the base plate portion 49a, and the outer side faces of the guide wall portions 49b are in contact with the inner faces of the two side walls adjacent to the side wall in which the cutaway 45b of the housing 45 is formed, and the end faces of the both edge portions of the base plate portion 49a are in contact with the inner face of the side wall opposed to the side wall in which the cutaway 45b of the housing 45 is formed, the guide member 49 is placed on the inner bottom face which is in the periphery of the stepped recess 45a of the housing 45, so as not to cover the first dome-like metal plate 46, and fixed by pressing the upper side faces of the guide wall portions 49b with the cover 55.

A recessed cutaway 49c for defining the press stroke of the push button 50 is formed in a middle upper portion of each of the guide wall portions 49b. One side (right side) end face of each cutaway 49c is formed as the stationary stopper 48 for restricting excessive press stroke (overstroke) of the push button 50.

In the push button 50, a base plate portion 50a which is formed into a U-like shape in a plan view, an operating portion 50b which is protruded from a middle outer side face of an intermediate edge of the base plate portion 50a, and shoulder portions 50c configured by both end outer side faces of the intermediate edge of the base plate portion 50a are integrally formed. In a state where the operating portion 50b is outward protruded from the cutaway 45b of the housing 45, the shoulder portions 50c are opposed to inner faces on the both sides of the cutaway 45b of the side wall in which the cutaway 45b of the housing 45 is formed, the lower face of the base plate portion 50a is in contact with the upper face of the base plate portion 49a of the guide member 49, and the outer side faces of both end edge portions of the base plate portion 50a are in contact with the inner faces of the guide wall portions 49b of the guide member 49, the push button 50 is supported by the guide member 49, the upper face of the base plate portion 50a is slidably pressed by the cover 55, and the push button 50 is slidingly guided in the pressing operation direction of the operating portion 50b.

The inclined portion 51 of the presser 54 is protruded from below to the inside of the base plate portion 50a. A middle inner side face of the intermediate edge of the base plate portion 50a opposed to the inclined portion 51 is formed as a presser press-down portion 50d which presses down the presser 54 while sliding in contact with the inclined portion 51.

Movable stoppers 50e are formed integrally with outer side faces of the both end edges of the base plate portion 50a. The movable stoppers 50e are outward protruded to be fit into the cutaways 49c formed in the guide wall portions 49b of the guide member 49. The movable stoppers 50e are moved in the cutaways 49c when the push button 50 is pressed as a result of a pressing operation on the operating portion 50b, and, at the end of the press stroke of the push button 50, received by the stationary stoppers 48 configured by side end faces of one sides (right sides) of the cutaways 49c, thereby restricting an excessive press stroke (overstroke) of the push button 50.

The inclined portion 51 and pressing portion 53 of the presser 54 are integrally formed by an insulative synthetic resin, and the hinge portion 52 of the presser 54 is formed by a metal plate spring. The inclined portion 51 has a triangular prism-like shape which is laterally directed so that the side faces are triangular and the bottom face is rectangular. The pressing portion 53 has a semispherical shape which is downward protruded from the flat rectangular bottom face of the inclined portion 51. An annular groove 53a is formed in the outer peripheral face of a basal end portion of the pressing portion 53. In the hinge portion 52, a U-like engaging portion 52a is protruded to the both sides from the fixed end portion to be formed into an substantially T-like shape in a plan shape, and a circular mounting hole 52b is opened on the side of the free end. The fixed end portion of the hinge portion 52 is horizontally formed. By contrast, the remaining portion other than the horizontal fixed end portion is obliquely upward extended through a bent portion 52c bent in a Z shape, so as to have an inclination angle $\theta$.

The presser 54 is assembled in the following manner. The semispherical pressing portion 53 which is downward protruded from the flat rectangular bottom face of the inclined portion 51 is pressingly inserted from above into the mounting hole 52b which is opened in the free end side of the hinge portion 52, to be protruded into the side of lower face of the hinge portion 52. A portion of the hinge portion 52 in the periphery of the mounting hole 52b is fitted into the annular groove 53a formed in the outer peripheral face of the basal end portion of the pressing portion 53, whereby the inclined portion 51 is attached upward protrudingly to the upper face of the hinge portion 52, and the pressing portion 53 is attached downward protrudingly to the lower face on the free end side of the hinge portion 52. As a result, the assembling process is completed. For example, the flat rectangular bottom face of the inclined portion 51, and the upper face of the hinge portion 52 may be bonded to each other by an adhesive agent, whereby the inclined portion 51 and the pressing portion 53 are prevented from rotating.

In the presser 54, the fixed end portion of the hinge portion 52, and the U-like engaging portion 52a which is protrudingly formed on the both sides of the fixed end portion are sandwiched and fixed between an inner bottom face existing between the side wall of the housing 45 where the cutaway 45b is formed, and the stepped recess 45a, and an outer bottom face of the intermediate edge portion of the base plate portion 49a of the guide member 49 which is opposed to the inner bottom face, and the hinge portion 52 is supported in a cantilevered manner. According to the configuration, the inclined portion 51 is placed inside the base plate portion 50a of the push button 50 by the hinge portion 52 having the inclination angle $\theta$. An inclined face 51a which is on one side with respect to the top of the inclined portion 51, and which is upward inclined in the pressing direction of the push button 50 is opposed to the presser press-down portion 50d which is formed by the middle inner side face of the intermediate edge of the base plate portion 50a of the push button 50. The pressing portion 53 is placed on the first dome-like metal plate 46. A substantially center portion of the lower end of the pressing portion 53 butts against a substantially center portion of the upper face of the first dome-like metal plate 46. The inclined portion 51 and the pressing portion 53 are supported in a vertically swingable manner between the first dome-like metal plate 46 and the cover 55, by the cantilevered hinge portion 52. In one of the two faces sandwiching the fixed end portion of the hinge portion 52 and the U-like engaging portion 52a protrudingly formed on the both sides of the fixed end portion, i.e., the inner bottom face existing between the side wall of the housing 45 where the cutaway 45b is formed, and the stepped recess 45a, or the outer bottom face of the intermediate edge portion of the base plate portion 49a of the guide member 49, a groove which is not shown, which has a depth corresponding to the thickness of the hinge portion 52, and into which the fixed end portion of the hinge portion 52 and the U-like engaging portion 52a protrudingly formed on the both sides of the fixed end portion are embedded is formed. This causes the resin of the housing 45 or the guide member 49 to enter the inside of the U-like engaging portion 52a, whereby positioning of the presser 54 can be performed. In this case, the joining faces of the hinge portion 52, and the housing 45 and the guide member 49 may be bonded together by an adhesive agent.

The presser 54 is provided with an inclination angle $\theta$ which is gentler than that of the inclined face 51a of the inclined portion 51, by the hinge portion 52 which itself has the inclination angle $\theta$.

In the illustrated example, the presser 54 having the two-piece structure in which the inclined portion 51 is formed integrally with the side of the resin-made pressing portion 53 has been described. Alternatively, the presser may be formed as a two-piece structure in which the inclined portion 51 is formed integrally with the side of the hinge portion 52 configured by the metal plate spring, or a three-piece structure in which the inclined portion 51 is independently structured. In this case, a two-piece structure is higher in productivity than a three-piece structure, and more advantageous also in cost. A presser having a two- or three-piece structure may be formed by insert molding.

The cover 55 is formed by punching and bending an electrically conductive metal plate. The cover 55 comprises: a flat upper side plate 55a which covers the upper face of the housing 45; cover-positioning cutaways 55b which are formed in the four corners of the upper side plate 55a, and which are fitted with the projections 45c of the housing 45, respectively; first engaging portions 55c which are downward extended from two opposing side edges of the upper side plate 55a, and in which lower end portions are engaged from below with the engaging claws 45d of the housing 45, thereby fixing the cover 55; and second engaging portions 55d which are downward extended from the remaining two opposing side edges of the upper side plate 55a, and in which, in a state where they are fitted into the engaging grooves 45e of the housing 45, lower end portions are engaged from below with the outer bottom face of the housing 45, thereby fixing the cover 55.

As shown in FIG. 20, the lateral pushing type push switch 41 of the third embodiment is assembled in the following manner. The first and second dome-like metal plates 46, 47 are disposed in two or upper and lower stages in the stepped recess 45a of the housing 45. Then, the fixed end portion of the hinge portion 52 of the presser 54 and the U-like engaging portion 52a protrudingly formed on the both sides of the fixed end portion are placed on the inner bottom face existing between the side wall of the housing 45 where the cutaway 45b is formed, and the stepped recess 45a. The guide member 49 in which the stationary stopper 48 is integrally formed is placed on the inner bottom face which is in the periphery of the stepped recess 45a of the housing 45. While the operating portion 50b of the push button 50 is fitted into the cutaway 45b of the housing 45, and the movable stoppers 50e of the push button 50 are fitted into the cutaways 49c of the guide member 49, the base plate portion 50*a* of the push button 50 is overlapped on the base plate portion 49*a* of the guide member 49. Finally, the cover 55 is fitted from above to the housing 45 to be positioned and engaged therewith, thereby completing the assembling process.

Figure 23:
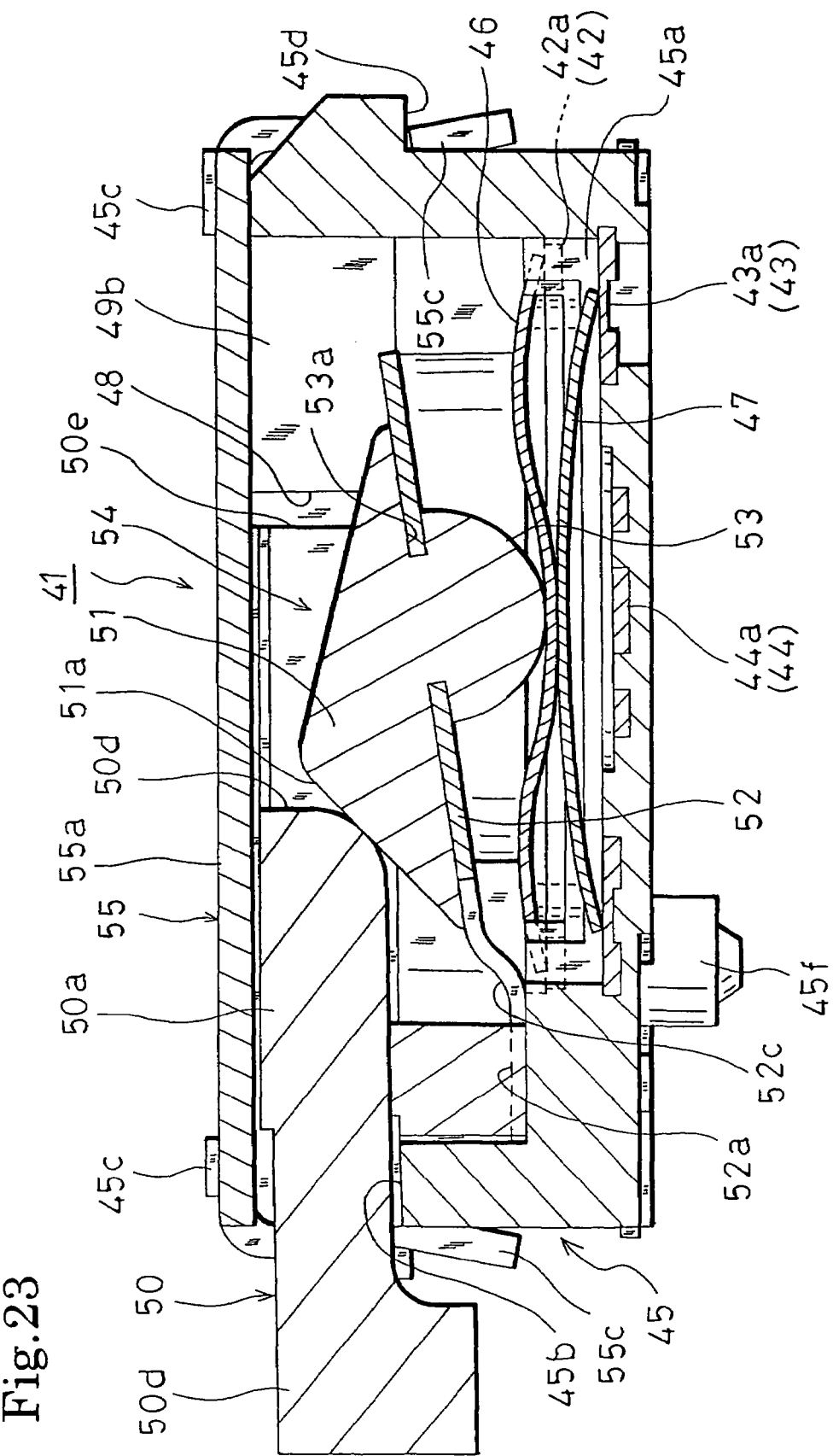
FIG. 23 is a section view showing a state after a first step switch of the lateral pushing type push switch of FIG. 18 is operated.
Figure 24:
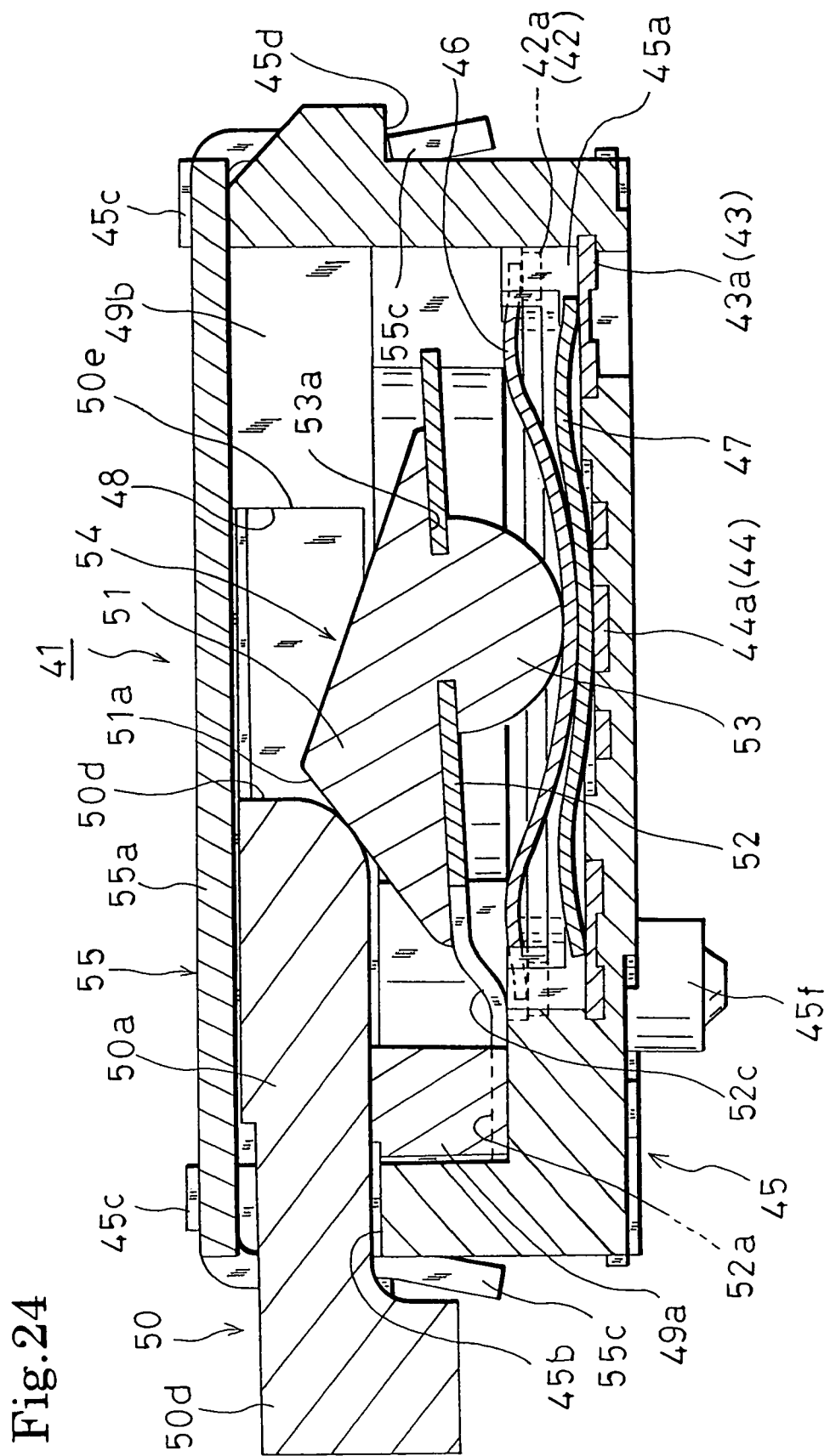
FIG. 24 is a section view showing a state after a second step switch of the lateral pushing type push switch of FIG. 18 is operated.

FIG. 23 is a section view showing a state after the switch operation of a first step (after the operation of the first dome-like metal plate) in the lateral pushing type push switch of the third embodiment, and FIG. 24 is a section view showing a state after the switch operation of a second step (after the operation of the second dome-like metal plate) in the lateral pushing type push switch. The operation of the lateral pushing type push switch of the third embodiment will be described with reference to FIGS. 19, 23, and 24.

FIG. 19 shows a state before the lateral pushing type push 41 is operated. In a pre-operation state in which the push button 50 is not operated, the push button 50 is held to a position where the shoulder portions 50*c* of the push button 50 butt against the inner faces on the both sides of the cutaway 45*b* of the side wall in which the cutaway 45*b* of the housing 45 is formed, the movable stoppers 50*e* are positioned in left end portions of the cutaways 49*c* formed in the guide wall portions 49*b* of the guide member 49, and the presser press-down portion 50*d* does not press the inclined face 51*a* of the inclined portion 51 of the presser 54. Therefore, the hinge portion 52 receives little elastic deformation, and the presser 54 is held to an inclined posture in a substantially free state.

The first and second dome-like metal plates 46, 47 are separated from each other in an upward inflated state, and the second dome-like metal plate 47 is separated from the second selection contact 44*a*. In this case, the pressing portion 53 of the presser 54 is upward pushed by a substantially center portion of the upper face of the first dome-like metal plate 46. Therefore, the presser 54 is held to an inclined posture in which the inclination angle is slightly steeper than the inclination angle θ in the free state, and the substantially center portion of the lower end of the pressing portion 53 is kept to be in contact with the substantially center portion of the upper face of the first dome-like metal plate 46.

When, in this state, the operating portion 50*b* of the push button 50 is pressed in the right direction of FIG. 19, the presser press-down portion 50*d* is rightward moved to be in contact with the inclined face 51*a* of the inclined portion 51 of the presser 54 to press it in the right direction, and slide over the inclined face 51*a* of the inclined portion 51 as shown in FIG. 23. In accordance with this, the presser 54 is downward pressed while the bent portion 52*c* of the hinge portion 52 is flexed and elastically deformed. Therefore, the substantially center portion of the lower end of the pressing portion 53 presses down the substantially center portion of the upper face of the first dome-like metal plate 46.

This causes the first dome-like metal plate 46 to be inverted to the downward direction, and in contact with the second dome-like metal plate 47 in the lower side. Therefore, the common contact 42*a* and the first selection contact 43*a* become conductive with each other through the first and second dome-like metal plates 46, 47, and the first switch of the first step is turned on.

When, in this state, the operating portion 50*b* of the push button 50 is further pressed in the right direction, the presser press-down portion 50*d* is rightward moved to further press the inclined face 51*a* of the inclined portion 51 of the presser 54 in the right direction, and further slide over the inclined face 51*a* of the inclined portion 51 as shown in FIG. 24. In accordance with this, the presser 54 is further downward pressed while the bent portion 52*c* of the hinge portion 52 is further flexed and elastically deformed. Therefore, the pressing portion 53 presses down the substantially center portion of the upper face of the second dome-like metal plate 47 through the first dome-like metal plate 46.

This causes the second dome-like metal plate 47 to be inverted to the downward direction, and in contact with the second selection contact 44*a*. Therefore, the common contact 42*a* and the second selection contact 44*a* become conductive with each other through the first and second dome-like metal plates 46, 47, and the second switch of the second step is turned on following the first switch of the first step.

At this time, the movable stoppers 50*e* of the push button 50 are moved to the right end portions in the cutaways 49*c* formed in the guide wall portions 49*b* of the guide member 49, and received by the stationary stoppers 48 of the guide member 49, thereby restricting the pressing of the push button 50 due to the pressing operation on the operating portion 50*b*, and limiting an excess press stroke (overstroke) of the push button 50 which causes excessive pressing of the first and second dome-like metal plates 46, 47. Therefore, the presser 54 keeps the operation states of the first and second dome-like metal plates 46, 47 to a substantially horizontal posture in which they are approximately parallel to the installation surface. During a period when the operating portion 50*b* is pressed and the second dome-like metal plate 47 is in contact with the second selection contact 44*a*, the on states of the first and second switches are maintained.

When, in this state, the press operating force on the operating portion 50*b* is released, the presser 54 is returned by an elastic returning force of the hinge portion 52 to the state before the switch operation shown in FIG. 19, and also the push button 50 is returned to the state before the switch operation shown in FIG. 19. At this time, in accordance with the return of the presser 54, the first and second dome-like metal plates 46, 47 are inverted to the upward direction by their elastic forces, and the second dome-like metal plate 47 is separated from the second selection contact 44*a* to turn off the second switch. Subsequently, the first dome-like metal plate 46 is separated from the second dome-like metal plate 47 to turn off the first switch.

As described above, the lateral pushing type push switch 41 of the third embodiment is a lateral pushing type push switch in which the operating portion 50*b* of the push button 50 is protruded from a side portion, the elastic dome-like metal plates 46, 47 are used as movable contacts, and the operating force in the moving direction of the push button 50 due to the pressing operation on the operating portion 50*b* is converted to a force in the operation direction of the dome-like metal plates 46, 47 perpendicular to the moving direction of the push button 50, wherein the switch comprises the presser 54 having: the inclined portion 51 which converts the operating force in the moving direction of the push button 50, to a force in the operation direction of the dome-like metal plates 46, 47; the flexible hinge portion 52 which allows the inclined portion 51 to be moved in the operation direction of the dome-like metal plates 46, 47; and the pressing portion 53 which presses down the first and second dome-like metal plates 46, 47. Therefore, the operating force is transmitted as it is to the dome-like metal plates 46, 47. Moreover, the substantially center portions of the dome-like metal plates 46, 47 are accurately pressed. Consequently, excellent operation properties of the dome-like metal plates 46, 47 can be obtained. Moreover, the hinge portion 52 can be made by a metal, and improvement of durability of the hinge portion 52 and stabilization of properties can be realized.

Furthermore, the pressing portion 53 of the presser 54 is molded by a resin, and the hinge portion 52 is formed by a metal plate spring. Therefore, improvement of durability and stabilization of properties due to formation of the hinge portion 52 by a metal can be realized.

The presser 54 itself has the inclination angle θ gentler than that of the inclined face 51a of the inclined portion 51. In the case of the one-step operation type, therefore, the operation stroke required in the presser 54 can be obtained while reducing the size of the inclined portion 51, and, in the case of the two-step operation type, the operation stroke of the presser 54 can be lengthened without increasing the size of the inclined portion 51.

At the end of the press stroke of the push button 50, the presser 54 is substantially parallel to the installation surface of the dome-like metal plates 46, 47. Therefore, the presser 54 can maintain the operation states of the dome-like metal plates 46, 47, in the posture that it is substantially parallel to the installation surface, and hence high contact reliability can be obtained.

In the lateral pushing type push switch 41 of the third embodiment, the dome-like metal plates 46, 47 are disposed in two stages in the operation direction. Therefore, a lateral pushing type push switch of the two-step operation type can be obtained without increasing the thickness of a final product.

Therefore, it is possible to provide the small and thin lateral pushing type push switch 41 in which excellent operation properties of the dome-like metal plates 46, 47 can be obtained, which has a prolonged life period, and which has high contact reliability. Furthermore, it is possible to provide the lateral pushing type push switch 41 of the two-step operation type in which excellent operation properties of the dome-like metal plates 46, 47 can be obtained, which is small and thin, which has a prolonged life period, and which has high contact reliability.

Figure 25:
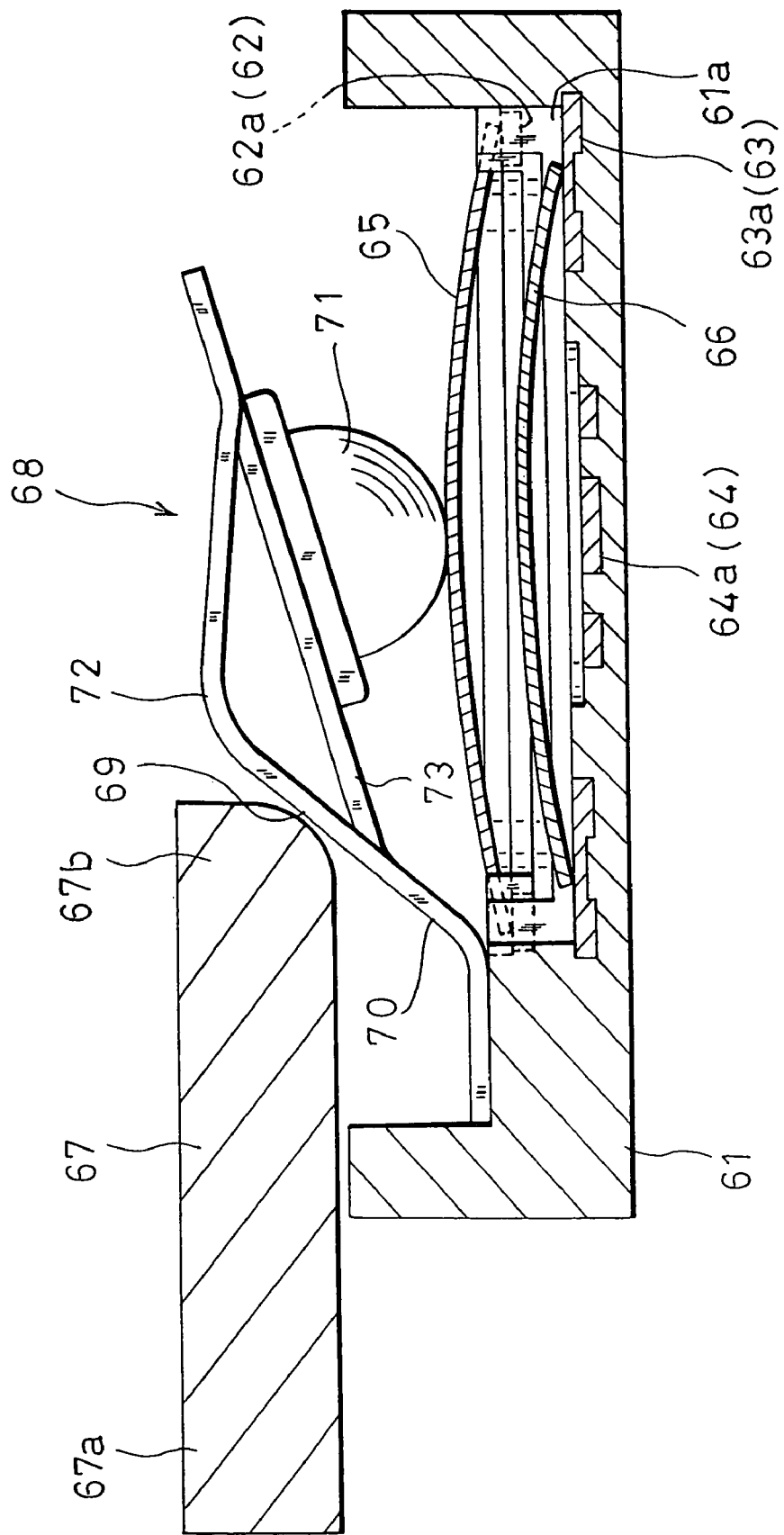
FIG. 25 is a section view showing a state before a lateral pushing type push switch of a fourth embodiment of the invention is operated.

Next, a fourth embodiment of the lateral pushing type push switch of the fourth embodiment of the invention will be described with reference to FIGS. 25 to 28. FIG. 25 is a section view showing a state before the lateral pushing type push switch of the two-step operation type of the fourth embodiment is operated.

Referring to the figures, 61 denotes an insulative housing which is made of a synthetic resin, and which is formed integrally with first, second, and third different stationary contact terminals 62, 63, 64 by insert molding, and which cooperates with a metal cover (not shown) to configure a switch case. A stepped recess 61a is formed on the inner bottom face of the housing 61. In an outer peripheral step face of the stepped recess 61a, a part of the first stationary contact terminal 62 is exposed substantially flush therewith to form a common contact 62a serving as a first stationary contact. In a bottom face outer side of the stepped recess 61a, a part of the second stationary contact terminal 63 is exposed substantially flush therewith to form a first selection contact 63a serving as a second stationary contact. In a bottom face center portion of the stepped recess 61a, a part of the third stationary contact terminal 64 is exposed substantially flush therewith to form a second selection contact 64a serving as a third stationary contact.

The stationary contact terminals 62, 63, 64 are formed by punching and bending an electrically conductive thin metal plate. One end of each of the stationary contact terminals 62, 63, 64 is led out to the outside of the housing 61 to form an external connection terminal (not shown) for surface-mounting the lateral pushing type push switch. The external connection terminals are to be fixed and connected by soldering to a printed circuit board which is not shown.

In the figures, 65 denotes an elastic first dome-like metal plate serving as a first movable contact. The first dome-like metal plate 65 is disposed on an outer peripheral step face of the stepped recess 61a of the housing 61, and an outer side portion is always in contact with the common contact 62a.

In the figures, 66 denotes an elastic second dome-like metal plate serving as a second movable contact. The second dome-like metal plate 66 is disposed on the bottom face of the stepped recess 61a of the housing 61, an outer side portion is always in contact with the first selection contact 63a, and a center portion is opposed to the second selection contact 64a.

The first and second dome-like metal plates 65, 66 are disposed in two or upper and lower stages in the stepped recess 61a of the housing 61.

In the figures, 67 denotes an insulative push button which is made of a synthetic resin, and which is to be laterally pressed. In the push button 67, an operating portion 67a which is protruded from one side (left side) of the housing 61 to the lateral outside of the housing 61, and a presser press-down portion 67b which is opposed to an inclined portion of a presser that is in the housing 61, and that will be described later are integrally formed. The push button 67 is supported so as to be laterally reciprocable in a predetermined range, by an insulative guide member (not shown) which is made of a synthetic resin, and which is fitted and fixed with the inside of the housing 61.

In the figures, 68 denotes the presser integrally having: the inclined portion 69 which allows the presser press-down portion 67b of the push button 67 to slide after contact, thereby converting the operating force in the moving direction (lateral direction) of the push button 67, to a force in the operation direction (downward direction) of the first and second dome-like metal plates 65, 66; a flexible hinge portion 70 which allows the inclined portion 69 to be moved in the operation direction of the first and second dome-like metal plates 65, 66; a pressing portion 71 which presses down the first and second dome-like metal plates 65, 66; and a curved portion 72 which is formed continuously with the inclined portion 69, and which deforms to absorb an excess operating force due to an excess press stroke (overstroke) of the push button 67.

In the presser 68, the inclined portion 69, the hinge portion 70, and the curved portion 72 are integrally formed by a cantilevered metal plate spring. In the metal plate spring, a horizontal fixed end portion which is fixed onto the inner bottom face of the housing 61 that is under the push button 67, an arm portion which is obliquely upward extended from the fixed end portion toward the front side of the presser press-down portion 67b of the push button 67, and a substantially semicircular free end portion which is extended from the tip end of the arm portion to the above of the first dome-like metal plate 65, and which is raised in an upward direction are continuously integrally formed. The free end portion is vertically displaced with setting the fixed end portion as a fulcrum. The hinge portion 70 is formed by a range from the fixed end portion to a lower portion of the arm portion, the inclined portion 69 is formed by an upper portion of the arm portion opposed to the presser press-down portion 67b of the push button 67, and the substantially semicircular curved portion 72 which is upward raised is formed by the free end portion.

A pressing-portion attaching plate 73 which is formed by a metal flat plate bridged between the inclined portion 69 and the tip end of the curved portion 72 is fixed under the curved portion 72 of the presser 68. The pressing portion 71 of the presser 68 is formed by an insulative synthetic resin, and has a semispherical shape in which an upper portion is fixed to the pressing-portion attaching plate 73, and which is downward protruded. A substantially center portion of the lower end butts against a substantially center portion of the upper face of the first dome-like metal plate 65.

Figure 26:
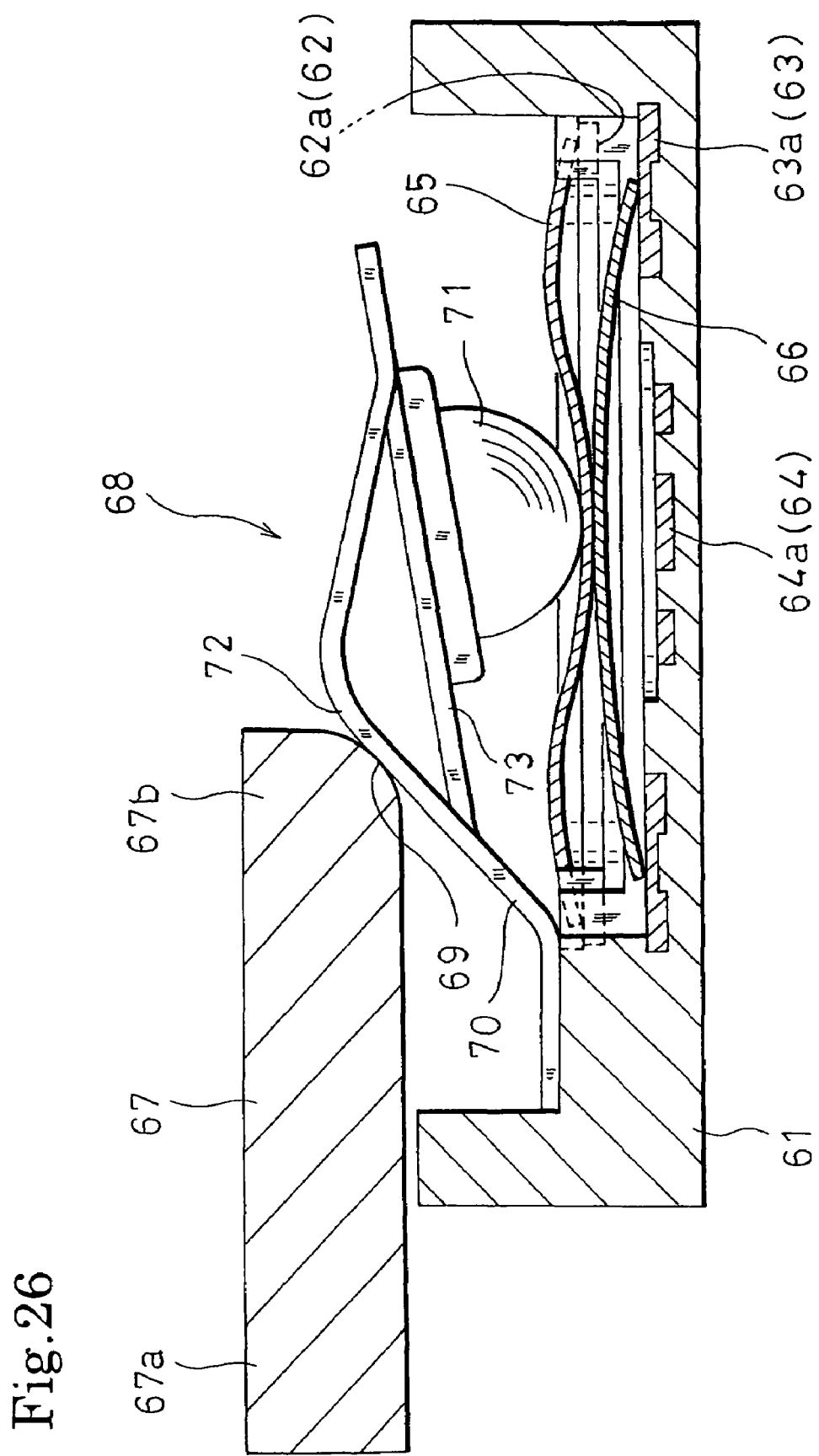
FIG. 26 is a section view showing a state after a first step switch of the lateral pushing type push switch of FIG. 25 is operated.
Figure 27:
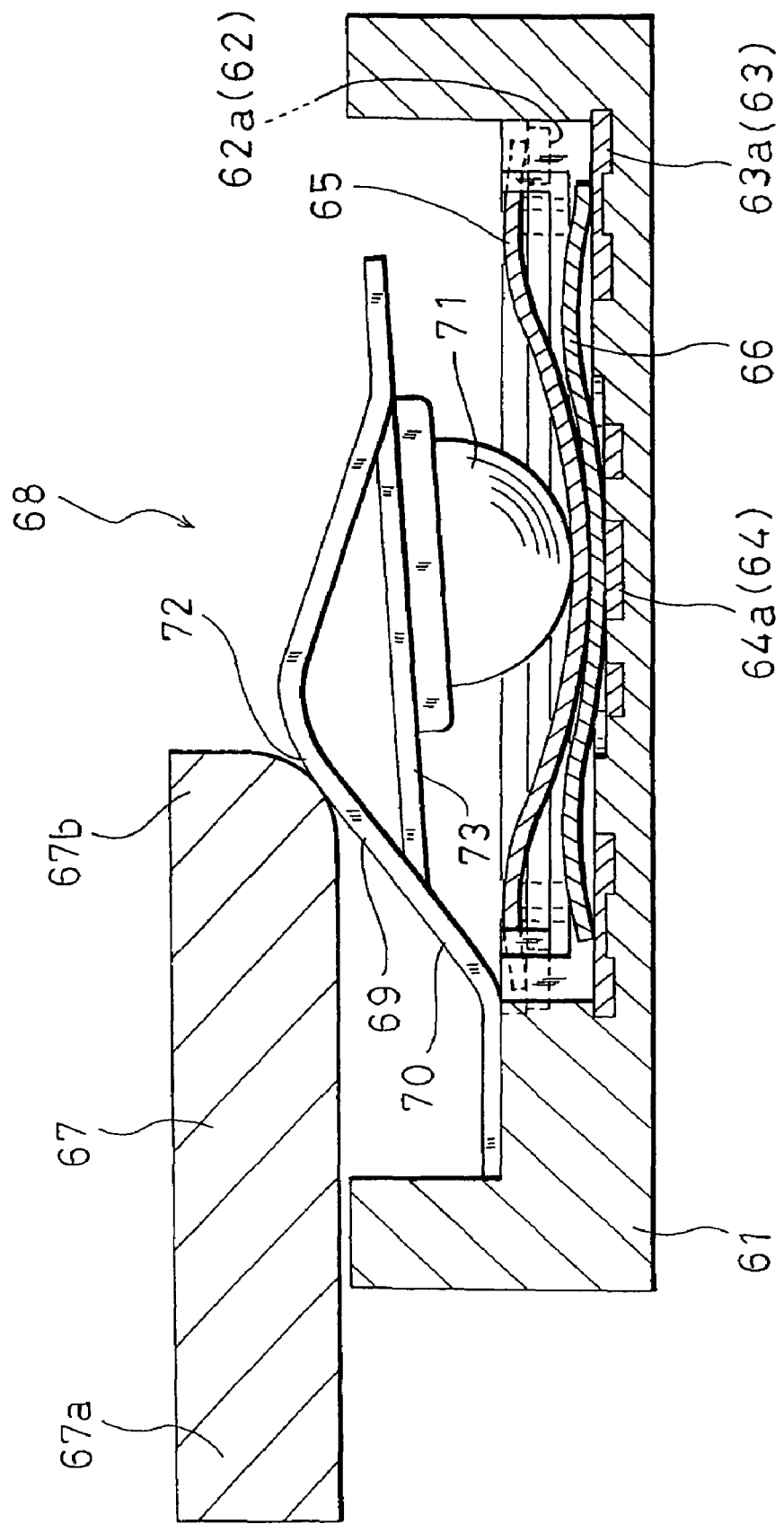
FIG. 27 is a section view showing a state after a second step switch of the lateral pushing type push switch of FIG. 25 is operated.

FIG. 26 is a section view showing a state after the switch operation of a first step in the lateral pushing type push switch of the fourth embodiment, and FIG. 27 is a section view showing a state after the switch operation of a second step in the lateral pushing type push switch. Next, the operation of the lateral pushing type push switch of the fourth embodiment will be described with reference to FIGS. 25 to 27.

As shown in FIG. 25, in a pre-operation state in which the push button 67 is not operated, the push button 67 is retracted to the initial position where the presser press-down portion 67b does not press the inclined portion 69 of the presser 68. Therefore, the hinge portion 70 receives substantially no elastic deformation, and the presser 68 is held to a substantially free state (initial state).

The first and second dome-like metal plates 65, 66 are separated from each other in an upward inflated free state, and the second dome-like metal plate 66 is separated from the second selection contact 64a. The substantially center portion of the lower end of the pressing portion 71 of the presser 68 is upward pressed by the substantially center portion of the upper face of the first dome-like metal plate 65, and the substantially center portion of the lower end of the pressing portion 71 and the substantially center portion of the upper face of the first dome-like metal plate 65 are held to be in contact with each other.

When, in this state, the operating portion 67a of the push button 67 is pressed in the right direction of FIG. 25, the presser press-down portion 67b of the push button 67 is rightward moved to be in contact with the inclined portion 69 of the presser 68, and then slide thereover as shown in FIG. 26. In accordance with this, the presser 68 downward moves the pressing portion 71 while the hinge portion 70 is flexed and elastically deformed. Therefore, the substantially center portion of the lower end of the pressing portion 71 presses down the substantially center portion of the upper face of the first dome-like metal plate 65.

This causes the first dome-like metal plate 65 to be inverted to the downward direction, and in contact with the second dome-like metal plate 66 in the lower side. Therefore, the common contact 62a and the first selection contact 63a become conductive with each other through the first and second dome-like metal plates 66, 67, and the first switch of the first step is turned on.

When, in this state, the operating portion 67a of the push button 67 is further pressed in the right direction of FIG. 26, the presser press-down portion 67b of the push button 67 is further moved in the right direction to slide over the inclined portion 69 of the presser 68 as shown in FIG. 27. In accordance with this, while the hinge portion 70 is further flexed and elastically deformed, the presser 68 further downward moves the pressing portion 71. Therefore, the pressing portion 71 presses down the substantially center portion of the upper face of the second dome-like metal plate 66 through the first dome-like metal plate 65.

This causes the second dome-like metal plate 66 to be inverted to the downward direction, and in contact with the second selection contact 64a. Therefore, the common contact 62a and the second selection contact 64a become conductive with each other through the first and second dome-like metal plates 65, 66, and the second switch of the second step is turned on following the first switch of the first step.

During a period when the operating portion 67a of the push button 67 is pressed and the second dome-like metal plate 66 is in contact with the second selection contact 64a, the on states of the first and second switches are maintained.

When, in this state, the press operating force on the operating portion 67a of the push button 67 is released, the presser 68 is returned by an elastic returning force of the hinge portion 70 to the initial state before the switch operation shown in FIG. 25, and also the push button 67 is returned to the initial state before the switch operation shown in FIG. 25. At this time, in accordance with the return of the presser 68, the first and second dome-like metal plates 65, 66 are inverted to the upward direction by their elastic forces, and the second dome-like metal plate 66 is separated from the second selection contact 64a to turn off the second switch. Subsequently, the first dome-like metal plate 65 is separated from the second dome-like metal plate 66 to turn off the first switch.

Figure 28:
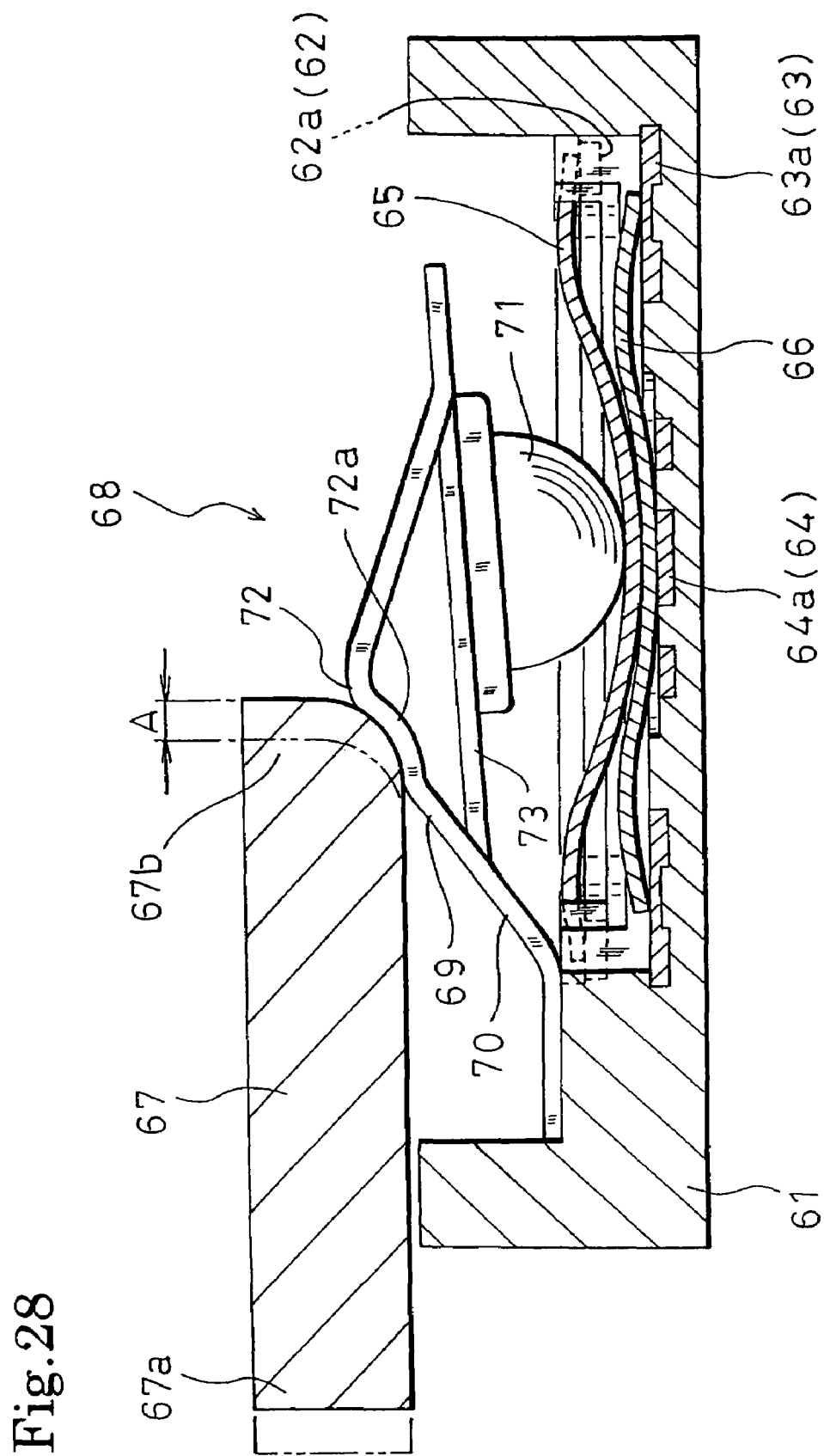
FIG. 28 is a section view showing a state where a push button of the lateral pushing type push switch of FIG. 25 is excessively pushed and an overstroke state is produced.

FIG. 28 is a section view showing a state where the push button of the lateral pushing type push switch of the fourth embodiment is excessively pushed and an overstroke state is produced.

When the second switch is turned on, an excess press stroke of the push button 67 cannot be sometimes accurately limited because of a dimensional error of a component, superposition of dimensional errors in assembling, or the like, so that the push button 67 is excessively pressed to cause overstroke as shown in FIG. 28. In this case, the presser press-down portion 67b is caused by the excess A of press stroke of the push button 67 to pass over the inclined portion 69 of the presser 68 and reach the curved portion 72 which is formed continuously from the inclined portion 69. Therefore, the presser press-down portion 67 presses the curved portion 72, thereby trying to further downward move the pressing portion 71 while the hinge portion 70 is further flexed and elastically deformed. However, the second dome-like metal plate 66 is already inverted to the downward direction, and in contact with the second selection contact 64a, and therefore the pressing portion 71 cannot be downward moved and the hinge portion 70 cannot be flexed.

In this state, the curved portion 72 of the presser 68 is pressed by the presser press-down portion 67b by the degree of the excess A of the press stroke of the push button 67. However, the tip end portion of the curved portion 72 is coupled to the inclined portion 69 by the pressing-portion attaching plate 73 so as not to allow the excessive operating force due to the excess A of the press stroke to escape. Therefore, a recess deformation 72a is produced in a contact portion between the curved portion 72 and the presser press-down portion 67b. The excessive operating force (load) due to the excess A of the press stroke is absorbed by the recess deformation 72a, thereby preventing the initial shapes of the inclined portion 69 of the presser 68 and the hinge portion 70 from being deformed by the excessive operating force due to the excess A of the press stroke.

In accordance with a pressing operation applied on the operating portion 67a of the push button 67, the presser 68 converts the lateral operating force to a force in the direction (downward direction) perpendicular to the operation direction, and transmits the force to the first and second dome-like metal plates 65, 66, thereby pressing down the first and second dome-like metal plates 65, 66 to be inverted. Therefore, the first and second switches of the first and second steps are turned on, and the contact pressure between the first and second dome-like metal plates 65, 66, and the contact pressures between the first and second dome-like metal plates 65, 66 and the stationary contacts 62a, 63a, 64a are ensured, and hence high contact reliability can be obtained.

When the press operating force on the operating portion 67a of the push button 67 is released, the push button 67 is returned to the initial position, and, in accordance with this, the curved portion 72 in which the recess deformation 72a is produced is returned by its own elastic returning force to the initial shape (substantially semicircular shape which is upward raised).

As described above, the lateral pushing type push switch 61 of the fourth embodiment is a lateral pushing type push switch in which the operating portion 67a of the push button 67 is protruded from a side portion, the elastic dome-like metal plates 65, 66 are used as movable contacts, and the operating force in the moving direction of the push button 67 due to the pressing operation on the operating portion 67a is converted to a force in the operation direction of the dome-like metal plates 65, 66 perpendicular to the moving direction of the push button 67, wherein the push button 67 comprises a presser press-down portion 67b which is integrated with the operating portion 67a, and the switch comprises the presser 68 having: the inclined portion 69 which causes the presser press-down portion 67b to slide after contact, thereby converting the operating force in the moving direction of the push button 67, to a force in the operation direction of the dome-like metal plates 65, 66; the flexible hinge portion 70 which moves the inclined portion 69 in the operation direction of the dome-like metal plates 65, 66; the pressing portion 71 which presses down the dome-like metal plates 65, 66; and the curved portion 72 which is formed continuously with the inclined portion 69, and in which an excess operating force due to an excess press stroke of the push button 67 is absorbed by the recess deformation 72a. Therefore, the operating force can be transmitted as it is to the dome-like metal plates 65, 66, and the substantially center portions of the dome-like metal plates 65, 66 can be accurately pressed. Consequently, excellent operation properties of the dome-like metal plates 65, 66 can be obtained. Moreover, an excess operating force due to an excess press stroke of the push button 67 can be absorbed by the recess deformation 72a of the curved portion 72 of the presser 68. Therefore, it is possible to prevent the initial shapes of the inclined portion 69 and the hinge portion 70 of the presser 68 from being deformed, and hence high contact reliability can be obtained.

Furthermore, the hinge portion 70 of the presser 68 is formed by a metal plate spring. Therefore, improvement of durability and stabilization of properties can be realized as compared with a resin-made hinge portion.

In the lateral pushing type push switch 61 of the fourth embodiment, the dome-like metal plates 65, 66 are disposed in two stages in the operation direction. Therefore, the lateral pushing type push switch 61 of the two-step operation type can be obtained.

Therefore, it is possible to provide the small and thin lateral pushing type push switch 61 which has contact reliability, and in which excellent operation properties of the dome-like metal plates 65, 66 can be obtained. Furthermore, it is possible to provide the lateral pushing type push switch 61 of the two-step operation type in which excellent operation properties of the dome-like metal plates 65, 66 can be obtained, which is small and thin, and which has high contact reliability.

In the above, the first to fourth embodiments illustrate preferred embodiments of the invention. The invention is not restricted to them, and can be implemented while variously modified without departing from the spirit of the invention.

What is claimed is:

1. A lateral pushing type push switch in which an operating portion of a push button protrudes from a side portion, an elastic dome-like metal plate is used as a movable contact, and an operating force in a moving direction of said push button due to a pressing operation on said operating portion is converted to a force in an operation direction of said dome-like metal plate perpendicular to the moving direction of said push button, wherein said switch comprises a presser having: an inclined portion which converts the operating force in the moving direction of said push button, to a force in the operation direction of said dome-like metal plate; and a pressing portion which presses down said dome-like metal plate, said presser being formed into a T-like shape which has two fixed ends and one free end, and which is flexible, said inclined portion being formed in said free end of said presser, and said dome-like metal plate being pressed down by said free end of said presser while a portion of said presser between said two fixed ends is twistingly deformed by pressing of said push button.

2. A lateral pushing type push switch according to claim 1, wherein said presser is integrally formed and coupled to a guide member which guides and supports said push button in the moving direction of said push button.

3. A lateral pushing type push switch according to claim 2, wherein said dome-like metal plate is disposed in two stages in the operation direction of said metal plate.

4. A lateral pushing type push switch according to claim 1, wherein said presser is integrally formed by coupling said two fixed ends of said presser to a guide member which laterally reciprocably supports said push button.

5. A lateral pushing type push switch according to claim 4, wherein said dome-like metal plate is disposed in two stages in the operation direction of said metal plate.

6. A lateral pushing type push switch according to claim 1, wherein said push button and said presser are in line contact with each other while rounding one of contact surfaces of said push button and said presser.

7. A lateral pushing type push switch according to claim 6, wherein said dome-like metal plate is disposed in two stages in the operation direction of said metal plate.

8. A lateral pushing type push switch according to claim 1, wherein a movable stopper is formed integrally with said push button, and a stationary stopper is formed integrally with said guide member, said stationary stopper receiving said movable stopper to restrict a movement of said push button due to a pressing operation on said operating portion, to a predetermined position.

9. A lateral pushing type push switch according to claim 8, wherein said dome-like metal plate is disposed in two stages in the operation direction of said metal plate.

10. A lateral pushing type push switch according to claim 1, wherein said presser itself has an inclination gentler than an inclination of said inclined portion.

11. A lateral pushing type push switch according to claim 10, wherein said dome-like metal plate is disposed in two stages in the operation direction of said metal plate.

12. A lateral pushing type push switch according to claim 1, wherein, when the movement of said push button is restricted by said movable stopper and said stationary stopper, said presser is substantially parallel to an installation surface of said dome-like metal plate.

13. A lateral pushing type push switch according to claim 12, wherein said dome-like metal plate is disposed in two stages in the operation direction of said metal plate.

14. A lateral pushing type push switch according to claim 1, wherein said push button comprises a presser press-down portion which is integrated with said operating portion, said inclined portion causes said presser press-down portion to slide after contact, thereby converting the operating force in the moving direction of said push button, to a force in the operation direction of said dome-like metal plate, and said presser has a curved portion which is formed continuously with said inclined portion, and which deforms to absorb an excess operating force due to an excess press stroke of the push button.

15. A lateral pushing type push switch according to claim 14, wherein said dome-like metal plate is disposed in two stages in the operation direction of said metal plate.

16. A lateral pushing type push switch according to claim 1, wherein said dome-like metal plate is disposed in two stages in the operation direction of said metal plate.

17. A lateral pushing type push switch according to claim 1, wherein said dome-like metal plate is disposed in two stages in the operation direction of said metal plate.

18. A lateral pushing type push switch according to claim 1, wherein said presser further has a thin plate-like swing fulcrum portion.

19. A lateral pushing type push switch according to claim 1, wherein said presser further has a flexible hinge portion which allows said inclined portion to be moved in the operation direction of said dome-like metal plate.

20. A lateral pushing type push switch in which an operating portion of a push button protrudes from a side portion, an elastic dome-like metal plate used as a movable contact, and an operating force in a moving direction of said push button due to a pressing operation on said operating portion which is converted to a force in an operation direction of said dome-like metal plate perpendicular to the moving direction of said push button, wherein said switch comprises a presser having: an inclined portion which converts the operating force in the moving direction of said push button, to a force in the operation direction of said dome-like metal plate; a flexible hinge portion which allows said inclined portion to be moved in the operation direction of said dome-like metal plate; and a pressing portion which presses down said dome-like metal plate, said pressing portion of said presser being made of a resin, and said hinge portion being formed by a metal plate spring.

21. A lateral pushing type push switch according to claim 20, wherein said dome-like metal plate is disposed in two stages in the operation direction of said metal plate.

* * * * *